United States Patent [19]

Ishiwatari et al.

[11] Patent Number: 5,283,820
[45] Date of Patent: Feb. 1, 1994

[54] SYSTEM UTILIZING PORTABLE DEVICE

[75] Inventors: Masumi Ishiwatari, Zushi; Tsuyoshi Kawanabe, Yokohama, both of Japan

[73] Assignee: Canon Kabushiki Kaisha, Tokyo, Japan

[21] Appl. No.: 969,526

[22] Filed: Oct. 30, 1992

Related U.S. Application Data

[63] Continuation of Ser. No. 538,972, Jun. 15, 1990, abandoned.

[30] Foreign Application Priority Data

Jun. 16, 1989 [JP] Japan ................... 1-154162

[51] Int. Cl.⁵ .................... H04M 1/57; H04M 1/00
[52] U.S. Cl. .................... 379/100; 379/354; 379/355
[58] Field of Search .......... 379/354, 355, 100, 93, 379/110; 340/825.31

[56] References Cited

U.S. PATENT DOCUMENTS

| | | | |
|---|---|---|---|
| 3,872,289 | 3/1975 | Kawanabe et al. | 235/152 |
| 4,064,559 | 12/1977 | Kawanabe et al. | 364/900 |
| 4,126,768 | 11/1978 | Grenzow | 379/357 |
| 4,261,042 | 4/1981 | Ishiwatari et al. | 364/709 |
| 4,456,925 | 6/1984 | Skerlos et al. | 358/85 |
| 4,766,433 | 8/1988 | Herman et al. | 340/825.31 |
| 4,900,902 | 2/1990 | Sakakibara | 379/100 |
| 4,961,217 | 10/1990 | Akiyama | 379/96 |

FOREIGN PATENT DOCUMENTS

| | | | |
|---|---|---|---|
| 69163 | 4/1983 | Japan | 379/100 |
| 54854 | 3/1988 | Japan | 379/100 |

*Primary Examiner*—James L. Dwyer
*Assistant Examiner*—Ahmad F. Matar
*Attorney, Agent, or Firm*—Fitzpatrick, Cella, Harper & Scinto

[57] ABSTRACT

A system generates a call according to the states of a photoreception unit of a call generator in response to data from a portable device. Data received by the photoreception unit from different types of portable devices can be processed and the portable device operation and the data transmission may be controlled according to the destination for the data and the mode of communication required by destination communication apparatus. Facsimile or telephone call data may be transmitted by the portable device in accordance with the type of destination communication apparatus.

26 Claims, 41 Drawing Sheets

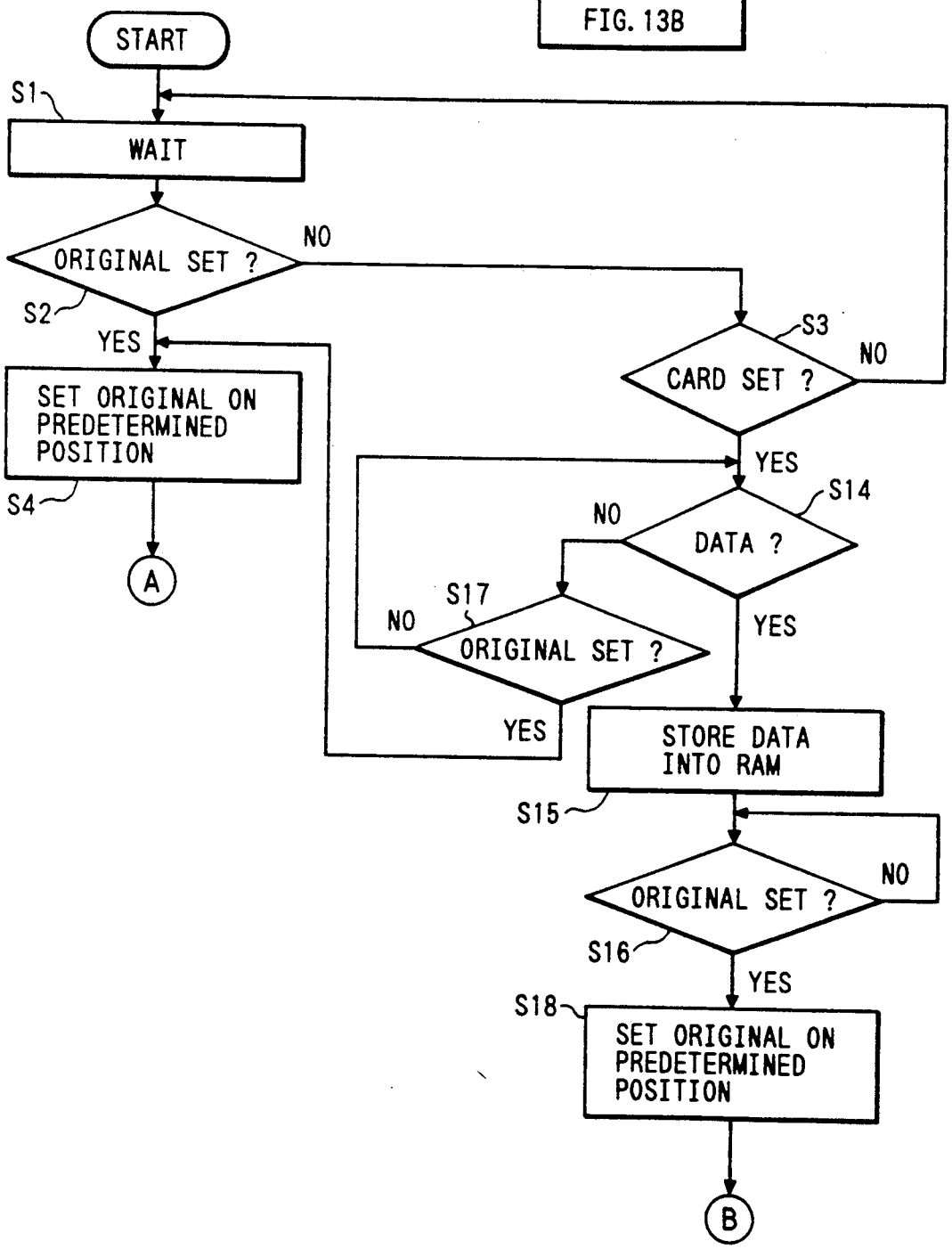

FIG. 21
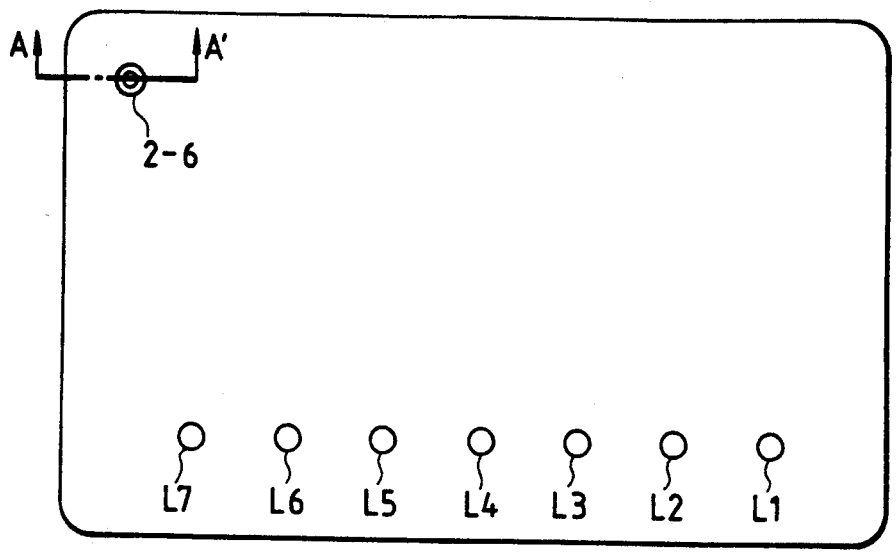
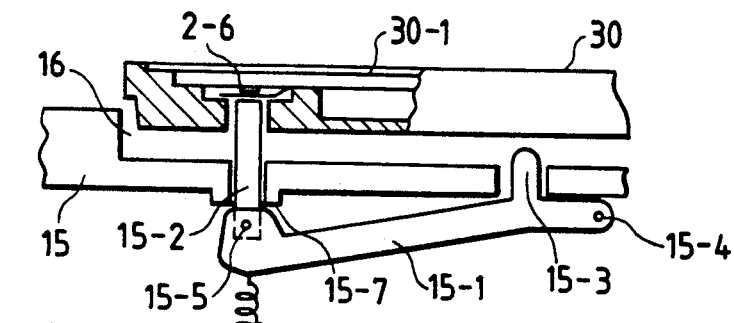
FIG. 22A
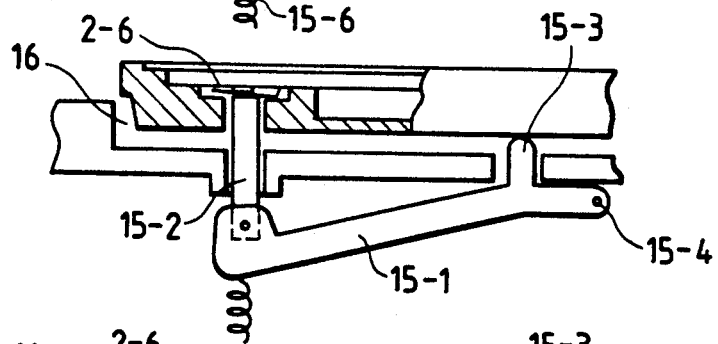
FIG. 22B
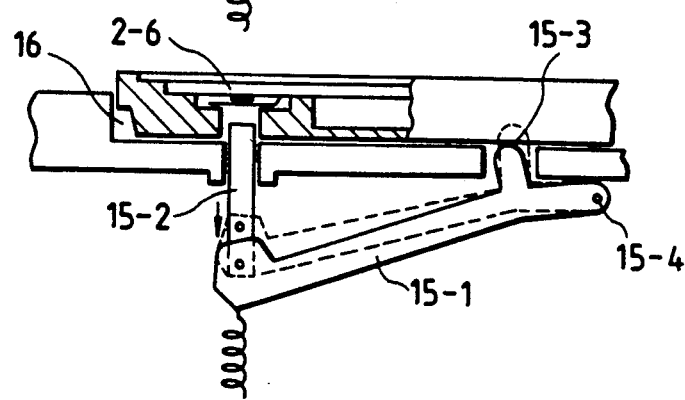
FIG. 22C

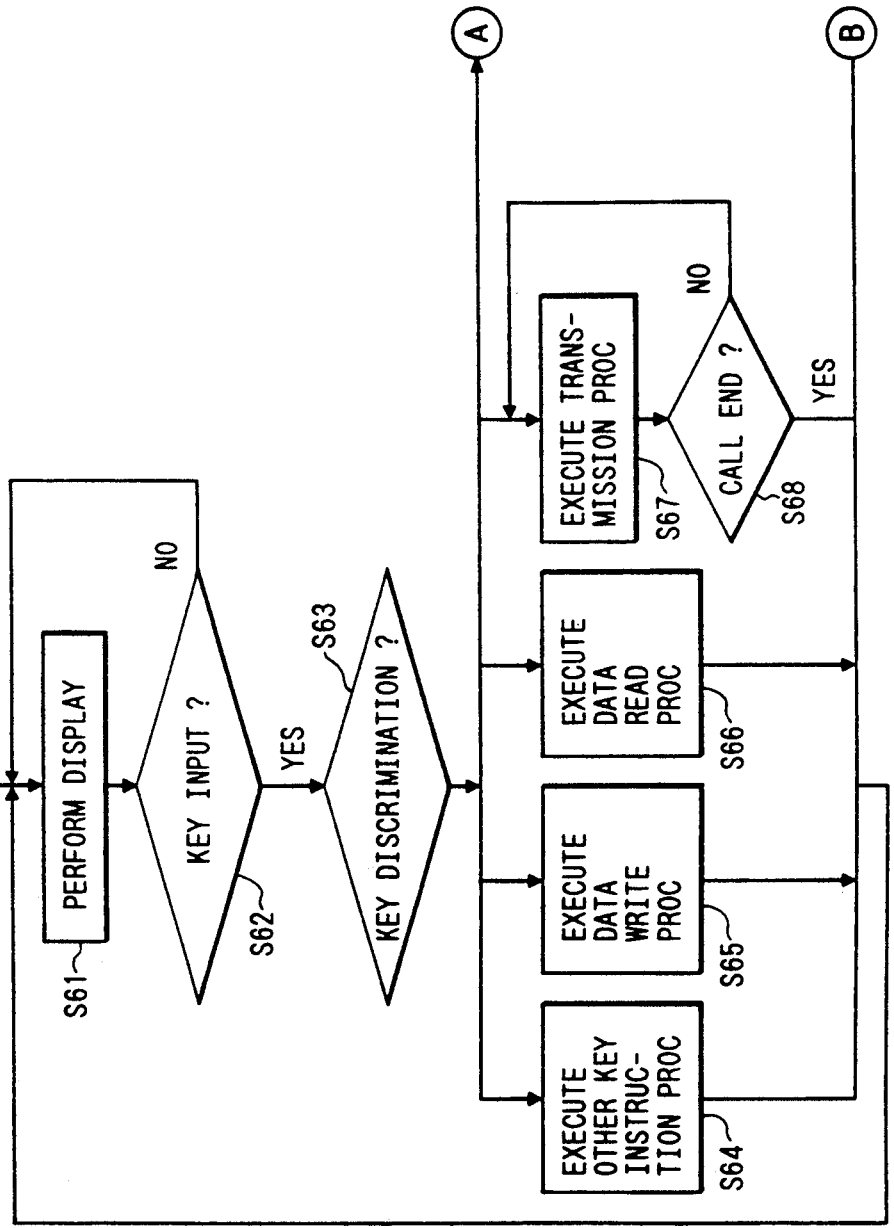

| | BIT CODE | DIAL NUMBER | | BIT CODE | DIAL NUMBER |
|---|---|---|---|---|---|
| 1 | 0001 | "1" | 9 | 1001 | "9" |
| 2 | 0010 | "2" | 10 | 1010 | "0" |
| 3 | 0011 | "3" | 11 | 1011 | "*" |
| 4 | 0100 | "4" | 12 | 1100 | "#" |
| 5 | 0101 | "5" | 13 | 1101 | "A" |
| 6 | 0110 | "6" | 14 | 1110 | "B" |
| 7 | 0111 | "7" | 15 | 1111 | "C" |
| 8 | 1000 | "8" | 0 | 0000 | "D" |

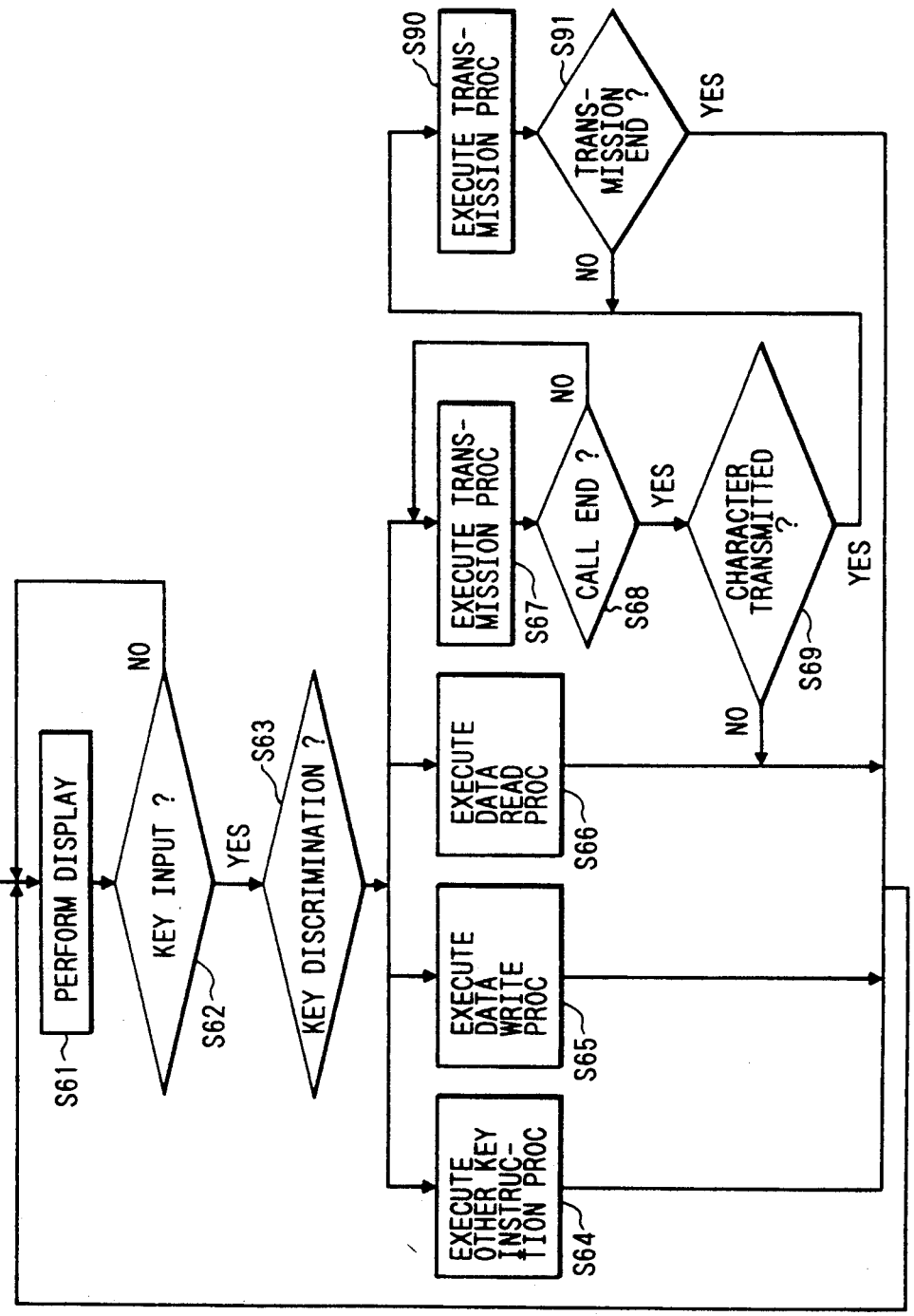

SYSTEM UTILIZING PORTABLE DEVICE

This application is a continuation of application Ser. No. 07/538,972 filed Jun. 15, 1990. now abandoned.

BACKGROUND OF THE INVENTION

1. Field of the Invention

The present invention relates to a system comprising a portable device which stores data such as dial numbers, and an apparatus for receiving data from the device and performing an operation based on the received data.

2. Related Background Art

A conventional system of this type includes an electronic telephone directory which stores a plurality of telephone numbers, searches a destination to be called from the stored telephone numbers, and generates a call as push button (PB) tones, and a telephone set. However, since the electronic telephone directory generates a call as speech (PB tones), the conventional system often suffers from an erroneous operation due to external noise.

Another system includes an IC card storing data such as a plurality of telephone numbers, and an apparatus such as a telephone set which can be electrically connected to the IC card. In this arrangement, however, connector pins for connecting the IC card and the telephone set are often erroneously bent.

When a telephone set and a facsimile apparatus of the same subscriber have different numbers, a calling party must select each different number in accordance with which of the telephone set and the facsimile apparatus is to be called.

SUMMARY OF THE INVENTION

It is an object of the present invention to provide an apparatus which can accurately receive data from a simple portable device.

It is another object of the present invention to provide a call generation apparatus which can accurately generate a call according to data from a ten-key pad or a simple portable device.

It is still another object of the present invention to provide a processing apparatus which can process data from a plurality of types of portable devices.

It is still another object of the present invention to provide a call generation apparatus for generating a call according to data from a plurality of types of portable devices.

It is still another object of the present invention to improve operability of a portable device which can be set on a host apparatus.

It is still another object of the present invention to provide a portable device which can transmit data in a mode according to a type of data destination.

It is still another object of the present invention to provide a portable device which can transmit call generation data according to a communication mode of a communication apparatus to the communication apparatus.

It is still another object of the present invention to provide a portable device which transmits facsimile or telephone call generation data to a communication apparatus in accordance with a type of communication apparatus.

The above and other objects of the present invention will be apparent from the description of the preferred embodiments.

BRIEF DESCRIPTION OF THE DRAWINGS

FIG. 21 is a bottom view of the electronic data memorandum of the sixth embodiment;

FIGS. 22A to 22C are sectional views of the electronic data memorandum of the sixth embodiment;

FIG. 39 is a flow chart showing processing of an electronic data memorandum according to the ninth embodiment of the present invention;

DETAILED DESCRIPTION OF THE PREFERRED EMBODIMENTS

First Embodiment

Figure 1:
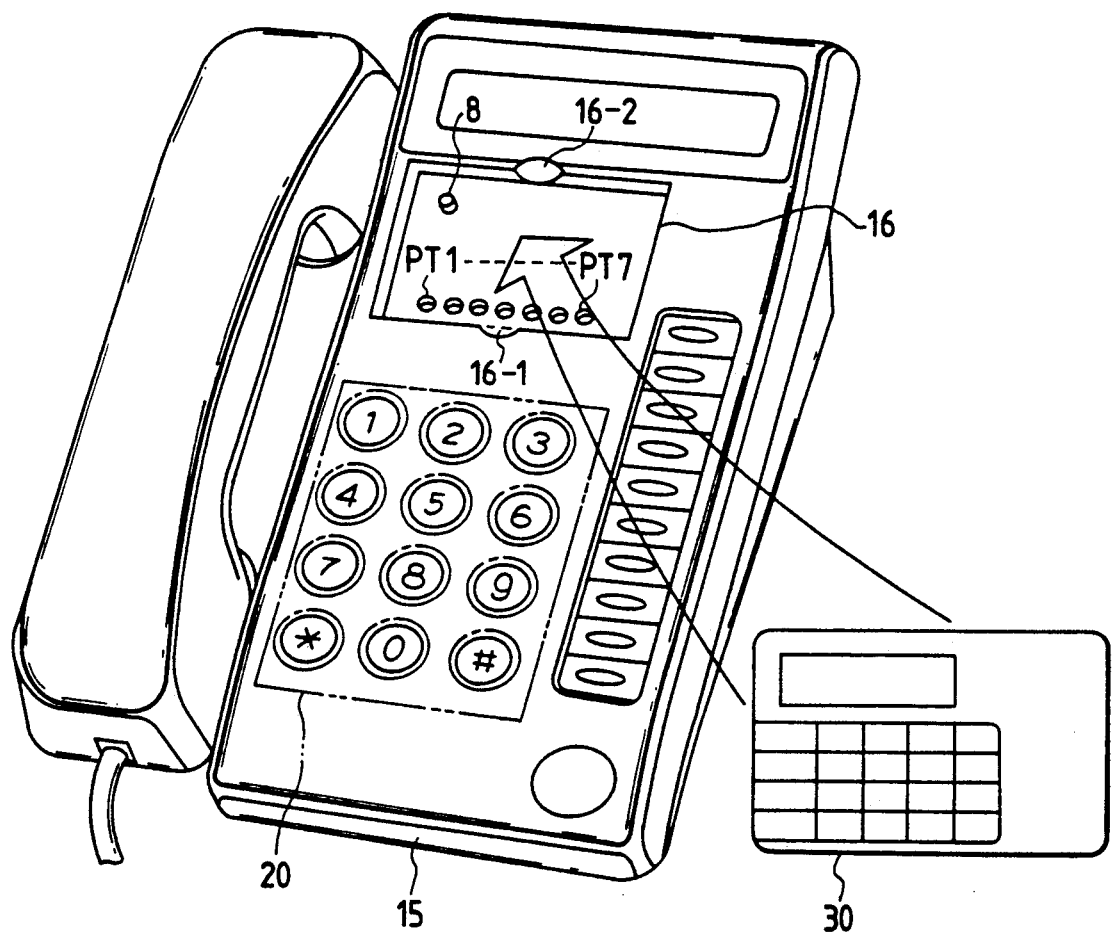
FIG. 1 is a top view of a telephone set according to the first embodiment of the present invention.

A telephone set 15 of this embodiment generates a call according to a dial number received from an electronic data memorandum 30 set on an operation panel, as shown in FIG. 1.

FIG. 1 shows an outer appearance of the telephone set for performing a call generation operation upon reception of dial number data stored in the electronic data memorandum 30. A recess portion 16 is formed to receive the electronic data memorandum 30. Notches 16-1 and 16-2 are formed in portions of the recess portion 16 to facilitate setup/removal of the electronic data memorandum 30. Photoreception sensor units PT-1 to PT-7 receive light signals from the electronic data memorandum 30. A switch 8 supplies or cuts off a power source to the photoreception sensor units PT. When the electronic data memorandum 30 is set on the recess portion, the switch 8 is turned on, and electric power is supplied to the photoreception sensor units PT. When the electronic data memorandum 30 is not set, the power source of the sensor units is turned off so as to prevent an erroneous operation caused by external light. In addition, the telephone set has dial key switch unit 20.

Figure 5:
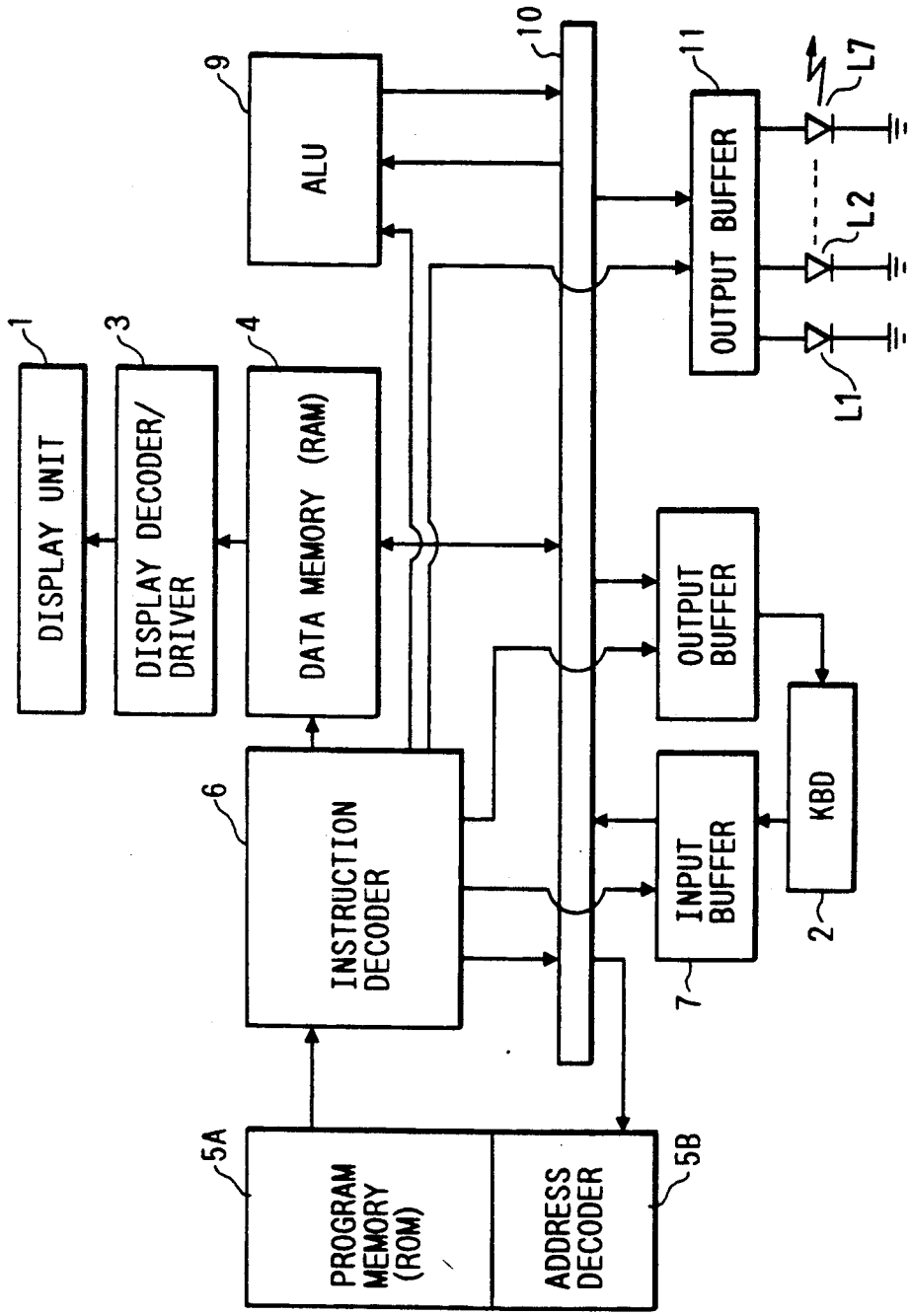
FIG. 5 is a block diagram of the electronic data memorandum of the first embodiment.

FIG. 5 is a block diagram showing an arrangement of the electronic data memorandum 30 having a credit-card size. A program memory 5A comprises a ROM (read-only memory), and stores a processing sequence (to be described later). An instruction stored at an address of the program memory 5A, which is designated by an address decoder 5B, is decoded by an instruction decoder 6, thereby controlling respective units. More specifically, for example, the instruction decoder 6 sends data stored in a data memory 4 comprising a RAM (random access memory) to an arithmetic and logic unit (ALU) 9 through a data bus 10 to cause it to execute arithmetic processing, and stores the arithmetic processing result in the RAM 4. The instruction decoder 6 sends data stored in the RAM 4 to a display decoder/driver 3 to drive a display unit 1, thereby displaying the data. When one of key switches on a keyboard 2 is operated, the instruction decoder 6 fetches a key signal from an input buffer 7, and stores corresponding data in the RAM 4 through the data bus 10. The instruction decoder 6 executes processing according to the depressed key in accordance with the processing sequence stored in the ROM 5A. The instruction decoder 6 sends dial data stored in the RAM 4 to an output buffer 11 through the data bus 10, drives LEDs (light-emitting diodes) L1 to L7 to convert the dial data into light signals, and outputs the light signals.

Figure 2:
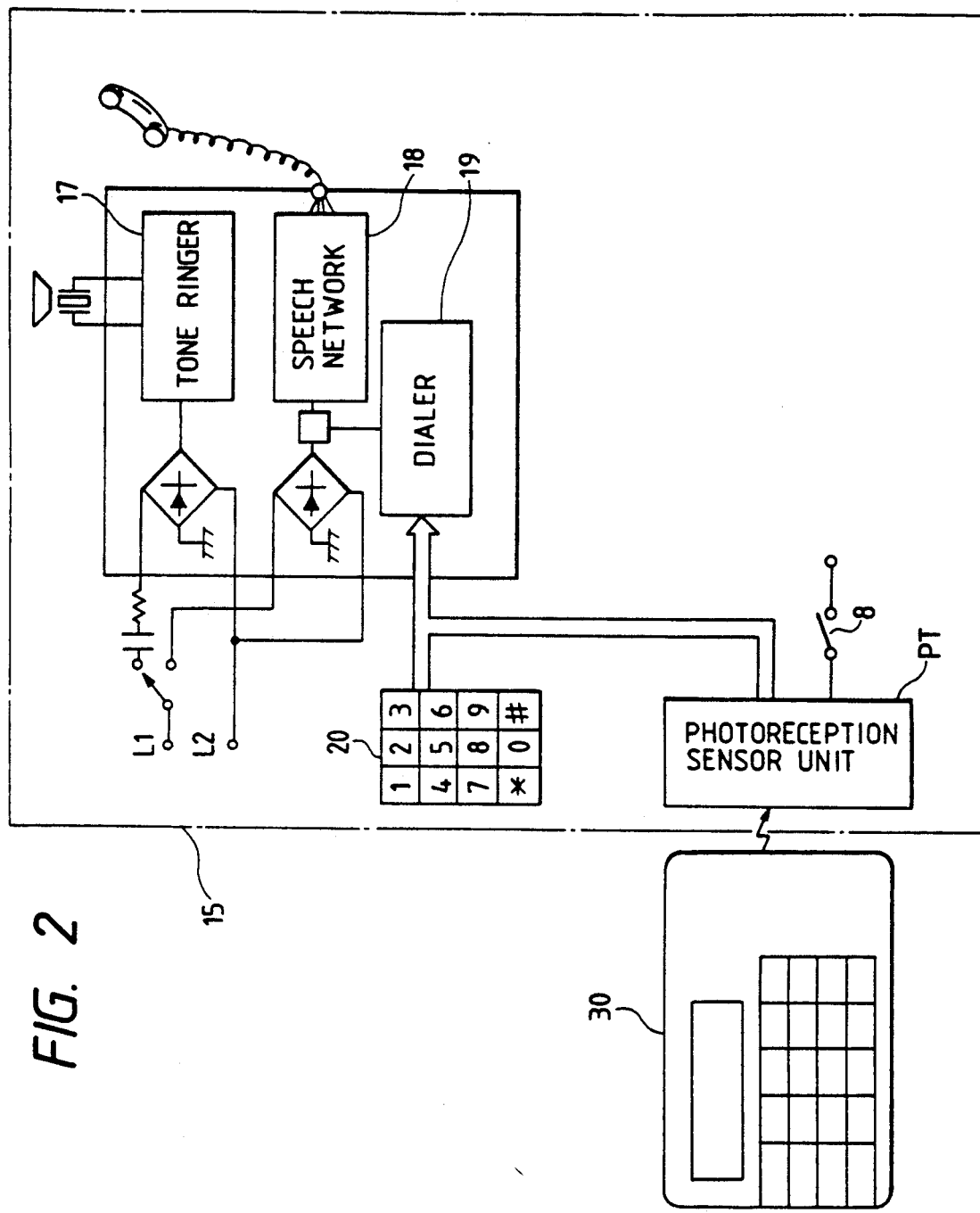
FIG. 2 is a block diagram of the telephone set of the first embodiment.

FIG. 2 is a block diagram showing an arrangement of the telephone set 15. The telephone set 15 includes a tone ringer 17, a speech network 18, and a dialer 19. The dialer 19 performs a call generation operation in accordance with a key input from the dial key switch unit 20 or a signal from the sensor units PT.

Figure 6:
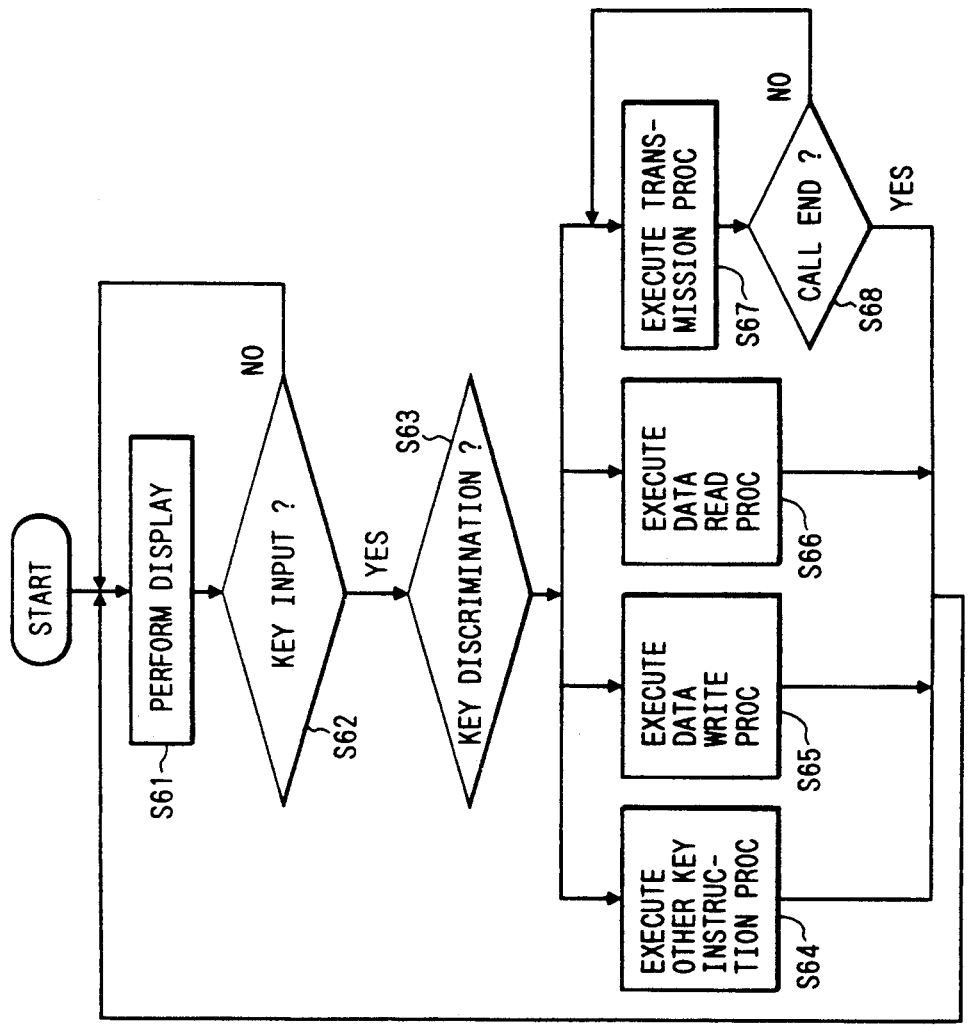
FIG. 6 is a flow chart showing processing of the electronic data memorandum of the first embodiment.

FIG. 6 shows a transmission processing sequence of a telephone number by the electronic data memorandum 30 of this embodiment. In step S61, the instruction decoder 6 selects data to be displayed from the RAM 4 (FIG. 5), and displays the selected data as display processing. The instruction decoder 6 discriminates in step S62 whether or not a key input is detected. If NO in step S62, the flow returns to step S61. If it is determined in step S62 that a key input is detected, the instruction decoder 6 discriminates processing corresponding to the input key. For example, if the instruction decoder 6 determines processing in step S65, the decoder 6 executes processing for writing numeral/character data input through another key instruction processing routine in step S64 in the RAM 4 (FIG. 5).

Figure 4:
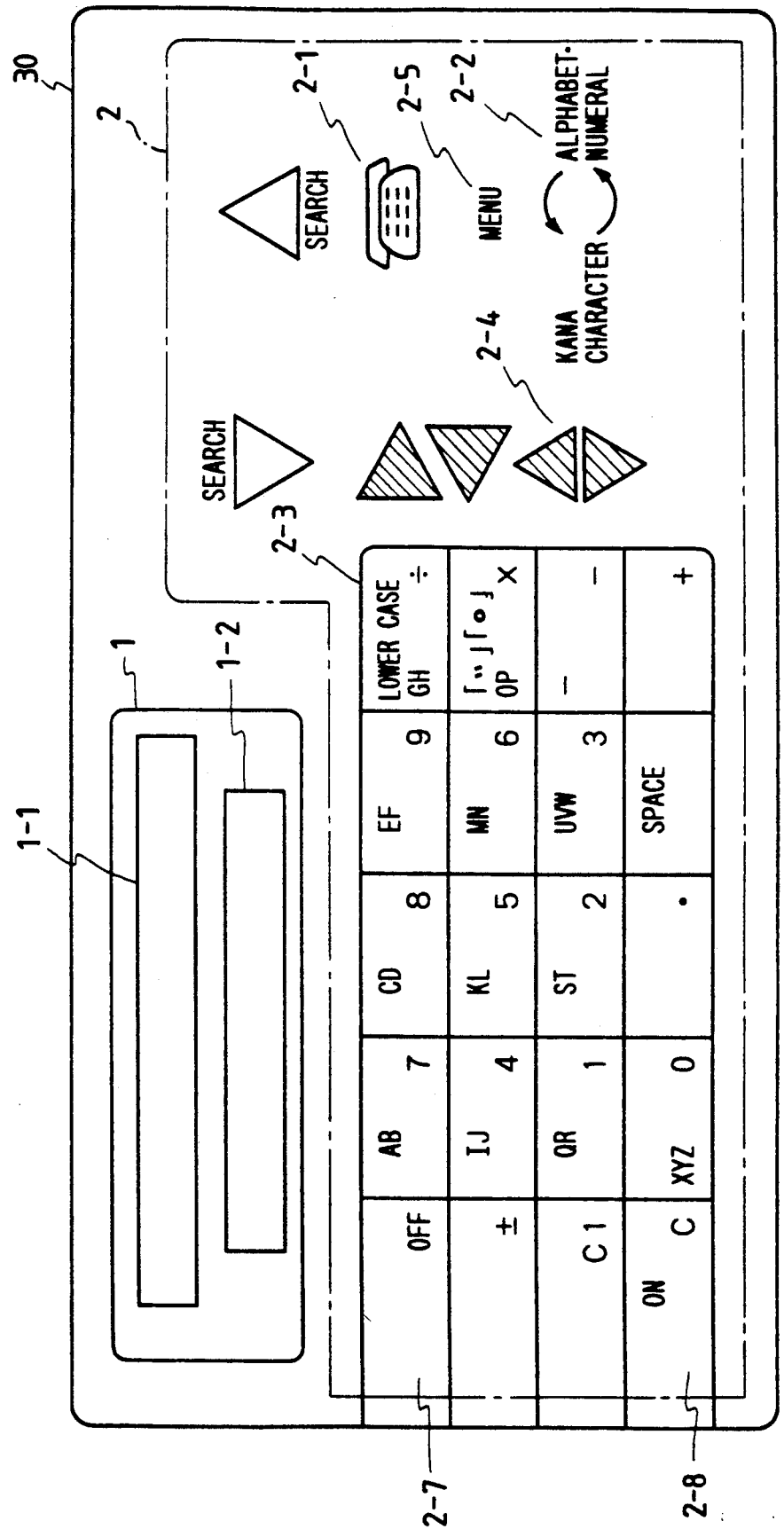
FIG. 4 is a top view of an electronic data memorandum of the first embodiment.

When a cursor is located in a character data input portion 1—1, i.e., in a Tel (telephone) mode, whether name data is written in alphabets or kana characters is selected using a kana/alphanumeric key 2—2 of the electronic data memorandum shown in the top view of FIG. 4. Character data are input using character keys 2-3 shown in FIG. 4. When number data is input, a cursor is moved to a numeral data display portion 1-2 to set a numeral input state, and numeral data are input using the character keys 2-3 shown in FIG. 4. On the other hand, if data read processing is determined in step S63, data written in the RAM 4 are displayed on the display unit 1 in step S65.

If dial number transmission processing is determined in step S63 upon depression of a dial start key 2-1 (FIG. 4), the instruction decoder 6 drives the LEDs according to data to be called (data such as a telephone number stored in the RAM 4, and read out to be displayed on the display portion 1-2 in step S66) in step S67. It is checked in step S68 if all the data to be called are transmitted. If NO in step S68, the flow returns to step S67, and the next data is transmitted. This processing is repeated until YES is determined in step S68.

Figure 3:
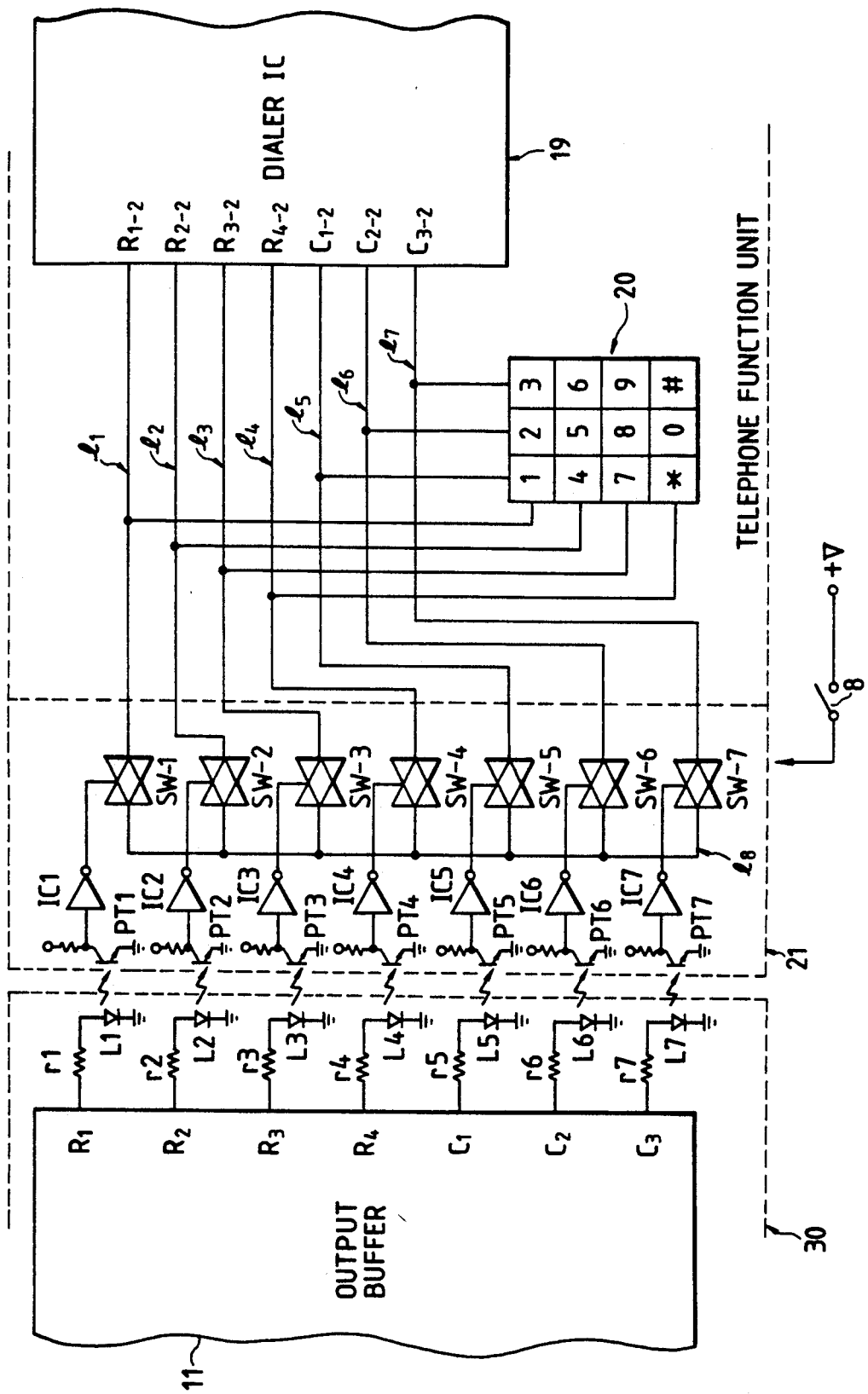
FIG. 3 is a circuit diagram of the telephone set of the first embodiment.

FIG. 3 is a circuit diagram of a light generation output unit of the electronic data memorandum 30 and the photoreception sensor units PT and the dialer 19 of the telephone set 15. The output buffer 11 has light signal output terminals $R_1$, $R_2$, $R_3$, $R_4$, $C_1$, $C_2$, and $C_3$. These outputs are connected to the LEDs L1 to L7 through current limiting resistors $r_1$ to $r_7$, respectively.

Figure 7:
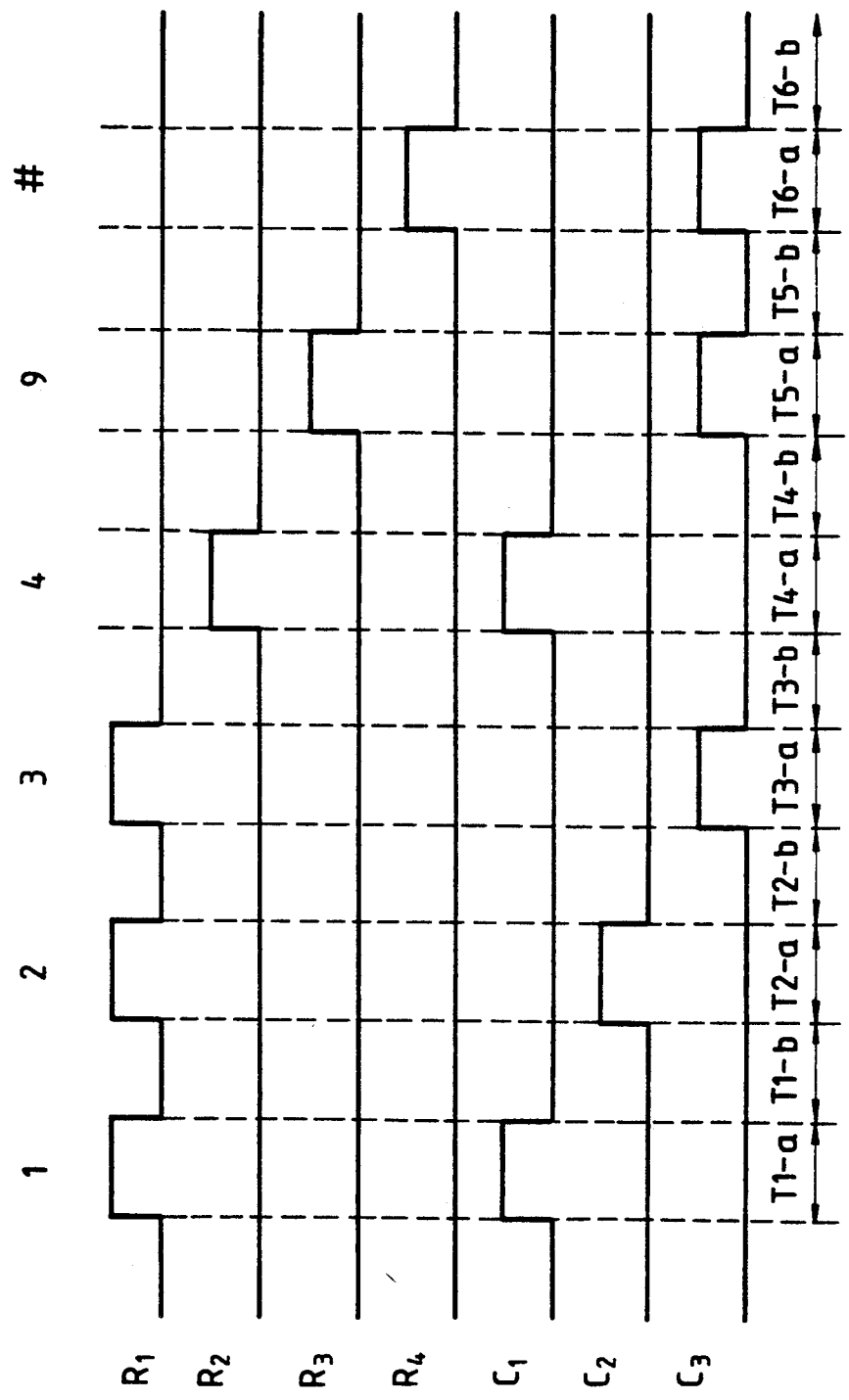
FIG. 7 is a timing chart of the first embodiment.

An operation performed when dial transmission data "1, 2, 3, 4, 9, #" are transmitted will be described below with reference to the timing chart of FIG. 7. In order to transmit "1" as dial data, signals of a so-called 2 of 7 mode are output, i.e., coded signals are output during a time interval T1-a so as to set the output terminals $R_1$ and $C_1$ to be "1" and set the other output terminals to be "0". In response to these outputs, a current flows through the LEDs L1 and L5, thereby emitting light. Since other LEDs correspond to outputs "0", they do not emit light. Upon reception of this light, only the photoreception sensor units PT1 and PT5 comprising, e.g., phototransistors, are turned on. "1" outputs are applied to analog switches SW-1 and SW-5 through following inverters IC1 and IC5. Thus, only these two switches are turned on.

Lines l1 and l8 connected to the analog switch SW-1 and lines l5 and l8 connected to the analog switch SW-5 are enabled, and the lines l1 and l5 are connected to each other. This is equivalent to a state wherein a "1" key of dial key switches 20 is depressed to enable (connect) the lines l1 and l5. In this manner, a "1" call generation instruction is input to a dialer IC 19, and the dialer IC 19 outputs "1" as a tone or pulse.

During a time interval T1-b, all the outputs of the output buffer 11 are "0"s, and all the phototransistors PT1 to PT7 are kept OFF, i.e., outputs of all the inverters IC1 to IC7 are "0". Therefore, the lines l1 to l7 are set in an open state, i.e., are not connected to any line. This is equivalent to a state wherein the "1" key of the dial key switch unit 20 is released. Similarly, upon transmission of data "2", the lines l1 and l6 are enabled in response to the outputs $R_1$ and $C_2$ during a time interval T2-a. Upon transmission of data "3", the lines l1 and l7 are enabled in response to the outputs $R_1$ and $C_3$ during a time interval T3-a. The lines l2 and l5 are enabled in response to the outputs $R_2$ and $C_1$ during a time interval T4-a, the lines l3 and l7 are enabled in response to the outputs $R_3$ and $C_3$ during a time interval T5-a, and the lines l4 and l7 are enabled in response to the outputs $R_4$ and $C_3$ during a time interval T6-a. Thus, call generation data "1, 2, 3, 4, 9, #" are transmitted to the dialer IC 19, thus generating a call.

In this embodiment, since signal exchange between the electronic data memorandum and a host apparatus is performed not by a mechanical connector but by photocoupling, a highly reliable signal exchange system is provided which is free from mechanical troubles (contact error, wear, cluttering, attachment of dust, and the like) due to accumulation of the number of attachment/detachment operations in use over a long period of time, and bent connector pins due to erroneous insertion.

Second Embodiment

This embodiment relates to a telephone set for receiving a dial number from an electronic data memorandum 30 as a binary code.

Figure 8:
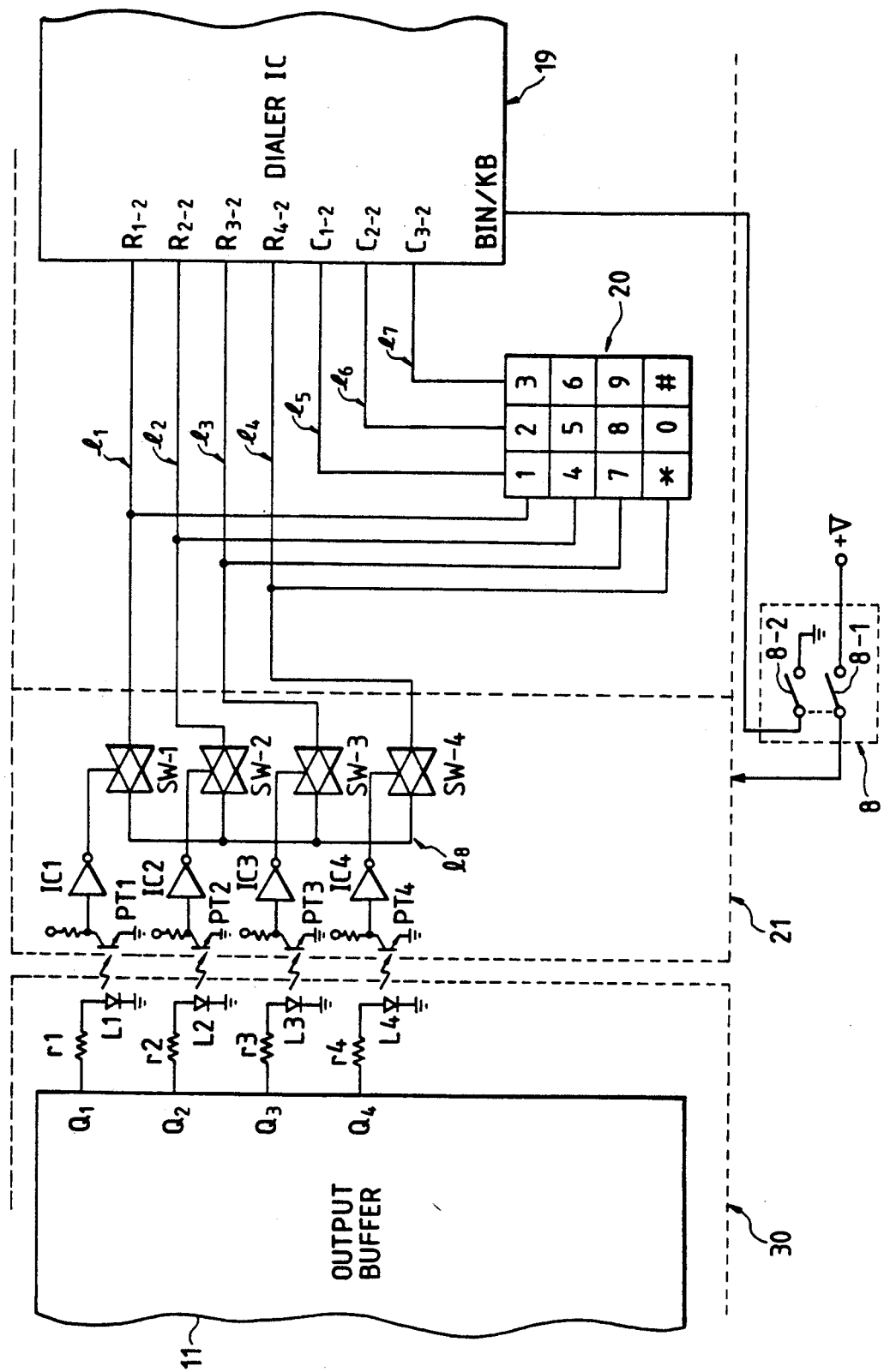
FIG. 8 is a circuit diagram of a telephone set according to the second embodiment of the present invention.

FIG. 8 is a circuit diagram of the telephone set. Two switches are used as a switch 8 operated when the electronic data memorandum 30 is set. One switch 8-1 switches a power supply to photoreception sensor units, and the other switch 8-2 switches, based on a terminal BIN/KB, whether a dialer IC 19 receives an input from a keyboard, i.e., a 2 of 7 mode is set or a CPU control mode is set.

When the electronic data memorandum 30 is set, the switches 8-1 and 8-2 are turned on, and the dialer IC 19 processes input signals from input terminals $R_{1-2}$ to $R_{4-2}$ and $C_{1-2}$ to $C_{3-2}$ as binary codes. On the other hand, when the electronic data memorandum 30 is not set, the switches 8-1 and 8-2 are turned off, and the dialer IC 19 processes input signals from the input terminals in the 2 of 7 mode.

Figure 9:
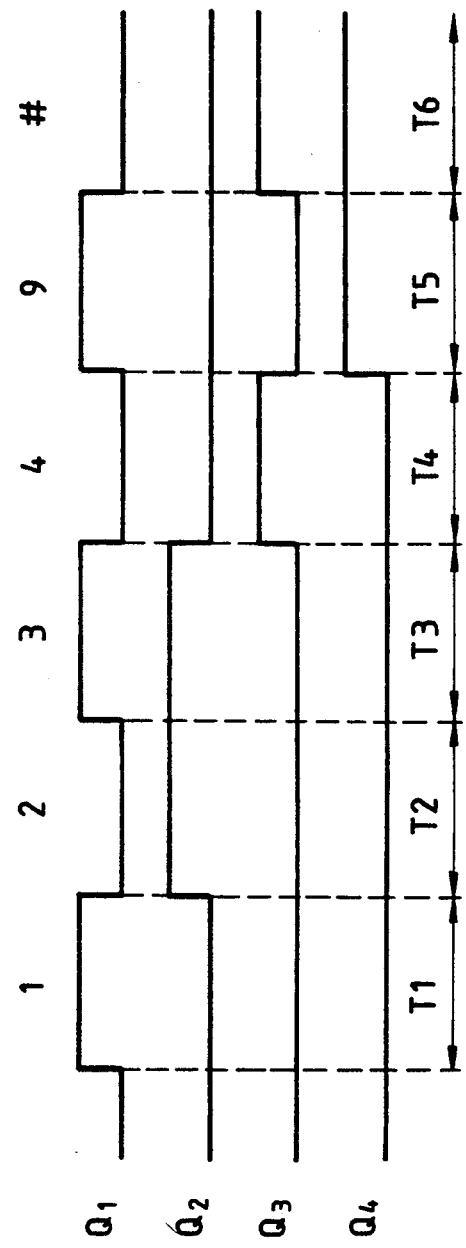
FIG. 9 is a timing chart of the second embodiment.

FIG. 9 is a timing chart of transmission data when binary codes are used as call generation data exchange codes. An output from an output terminal $Q_1$ of the output buffer 11 of the electronic data memorandum corresponds to a digit position of $2^0$; $Q_2$, $2^1$; $Q_3$, $2^2$; and $Q_4$, $2^3$. More specifically, call generation data "1" is output like $Q_1$="1", $Q_2$="0", $Q_3$="0", and $Q_4$="0" during a time interval T1, and data "2" is output like $Q_1$="0", $Q_2$="1", $Q_3$="0", and $Q_4$="0" during a time interval T2. In this manner, when data are exchanged using binary codes, the number of output terminals of the output buffer 11 can be reduced, and the number of elements, e.g., light-emitting elements such as LEDs and photoreception sensor units can be reduced.

Third Embodiment

Figure 10:
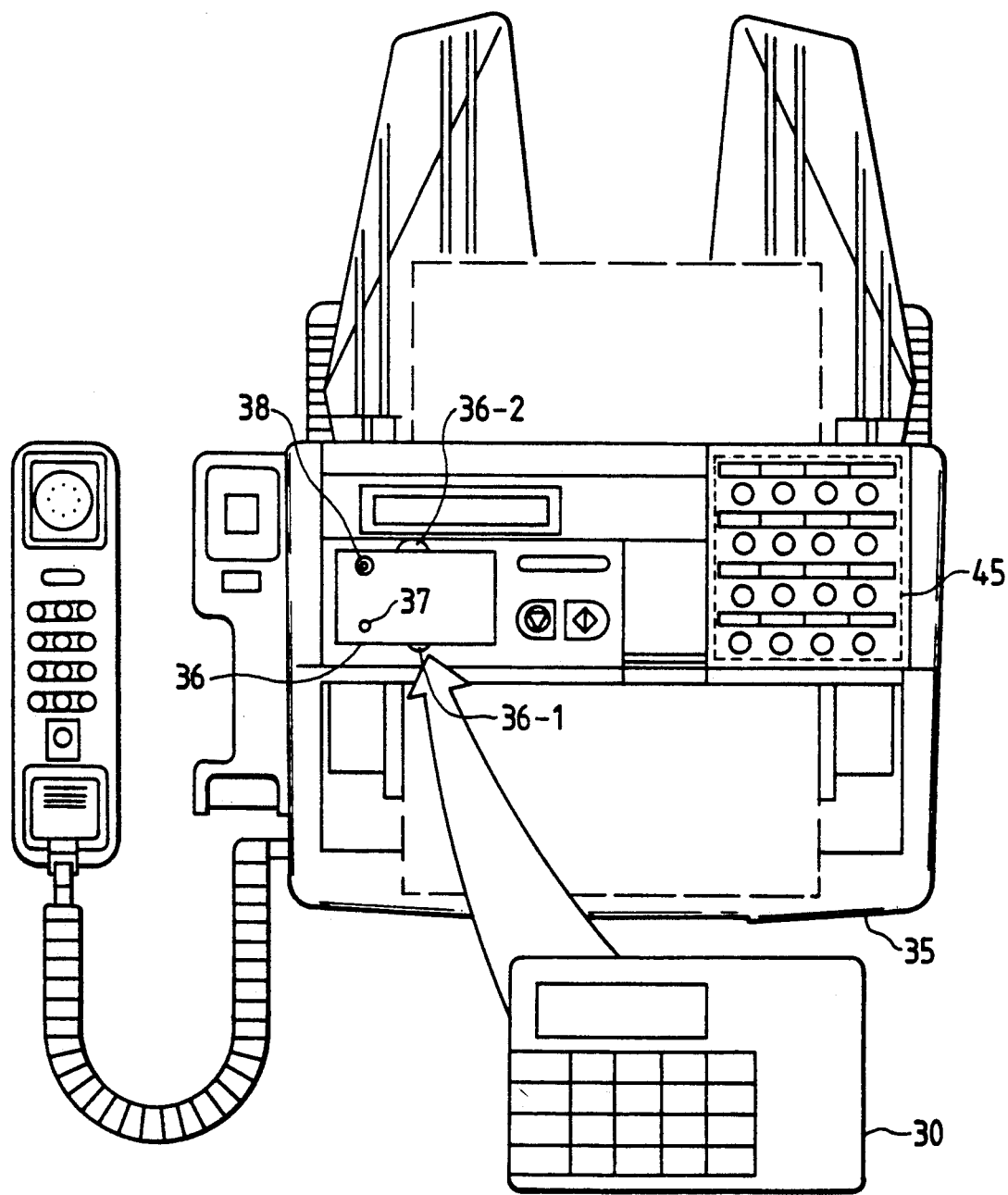
FIG. 10 is a top view of a facsimile apparatus according to the third embodiment of the present invention.

FIG. 10 shows an outer appearance of a facsimile apparatus for performing a call generation operation upon reception of dial number data stored in an electronic data memorandum. A recess portion 36 is formed in a facsimile main body 35 to position and fix an electronic data memorandum 30. Notches 36-1 and 36-2 are formed in portions of the recess portion 36 to facilitate setup/removal of the electronic data memorandum 30. A photoreception sensor unit 37 receives a light signal from the electronic data memorandum 30. A switch 38 detects whether or not the electronic data memorandum 30 is set.

Figure 11:
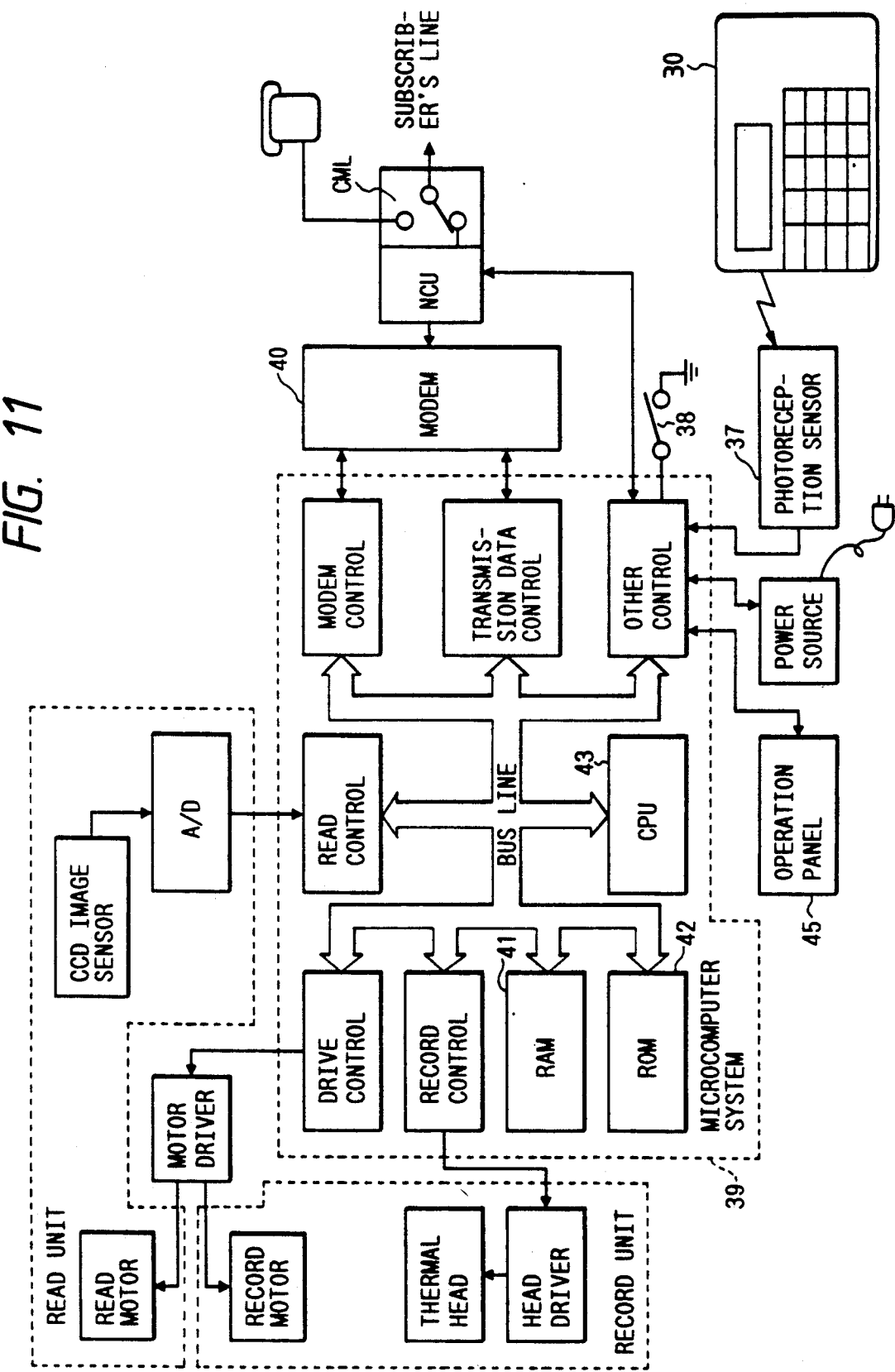
FIG. 11 is a block diagram of the facsimile apparatus of the third embodiment.

FIG. 11 is a block diagram showing a facsimile function. When a microcomputer system 39 detects by the state of the switch 38 that the electronic data memorandum 30 is set, it receives dial signal data which is sent from the electronic data memorandum 30 as a light signal and is photoelectrically converted by the photoreception sensor unit 37. The microcomputer system 39 controls a modem 40 on the basis of the received data to perform a call generation operation.

Figure 12:
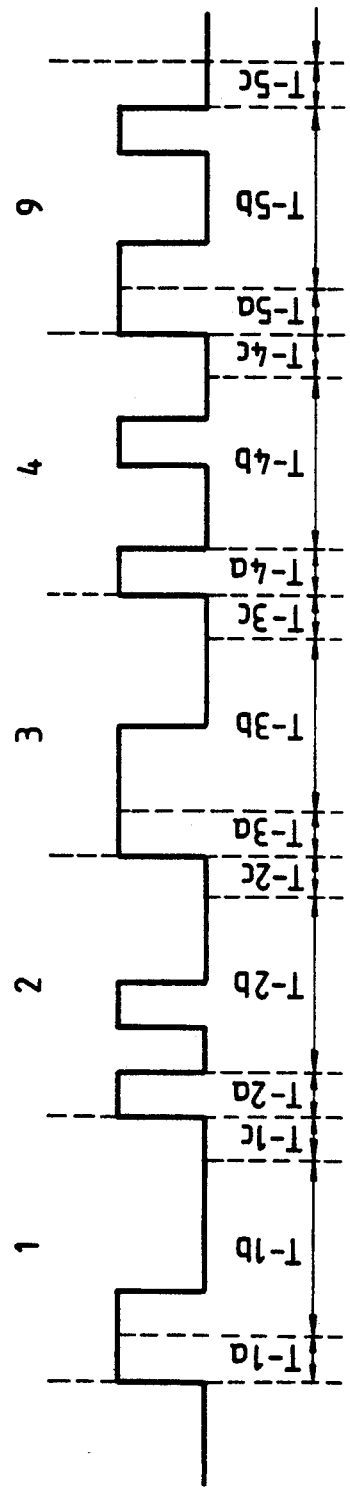
FIG. 12 is a timing chart of the third embodiment.

In this case, dial number data of the electronic data memorandum 30 is photoelectrically converted, and is then fetched by the microcomputer system 39. Therefore, data can be transmitted not by so-called parallel data but by serial data. For example, FIG. 12 shows a timing chart designed to output one dial number data in a data format similar to that of, e.g., the RS-232C, i.e., including a start bit+data bits (four bits)+a stop bit in a start-stop synchronization mode. In FIG. 12, T-1a corresponds to the start bit, T-1b corresponds to data bits (data "1"), and T-1c corresponds to the stop bit. With this data format, one data can be transmitted. Similarly, T-2a (start bit), T-2b (data bits=data "2"), T-2c (stop bit), and the like follow, thus exchanging dial number data "1", "2", "3", "4", and "9". In this manner, when a serial communication mode is employed, only a set of one light-emitting element and one photoreception element is required. Therefore, cost in terms of cost and assembly can be reduced, and mounting of elements can be considerably facilitated.

Figure 13B:
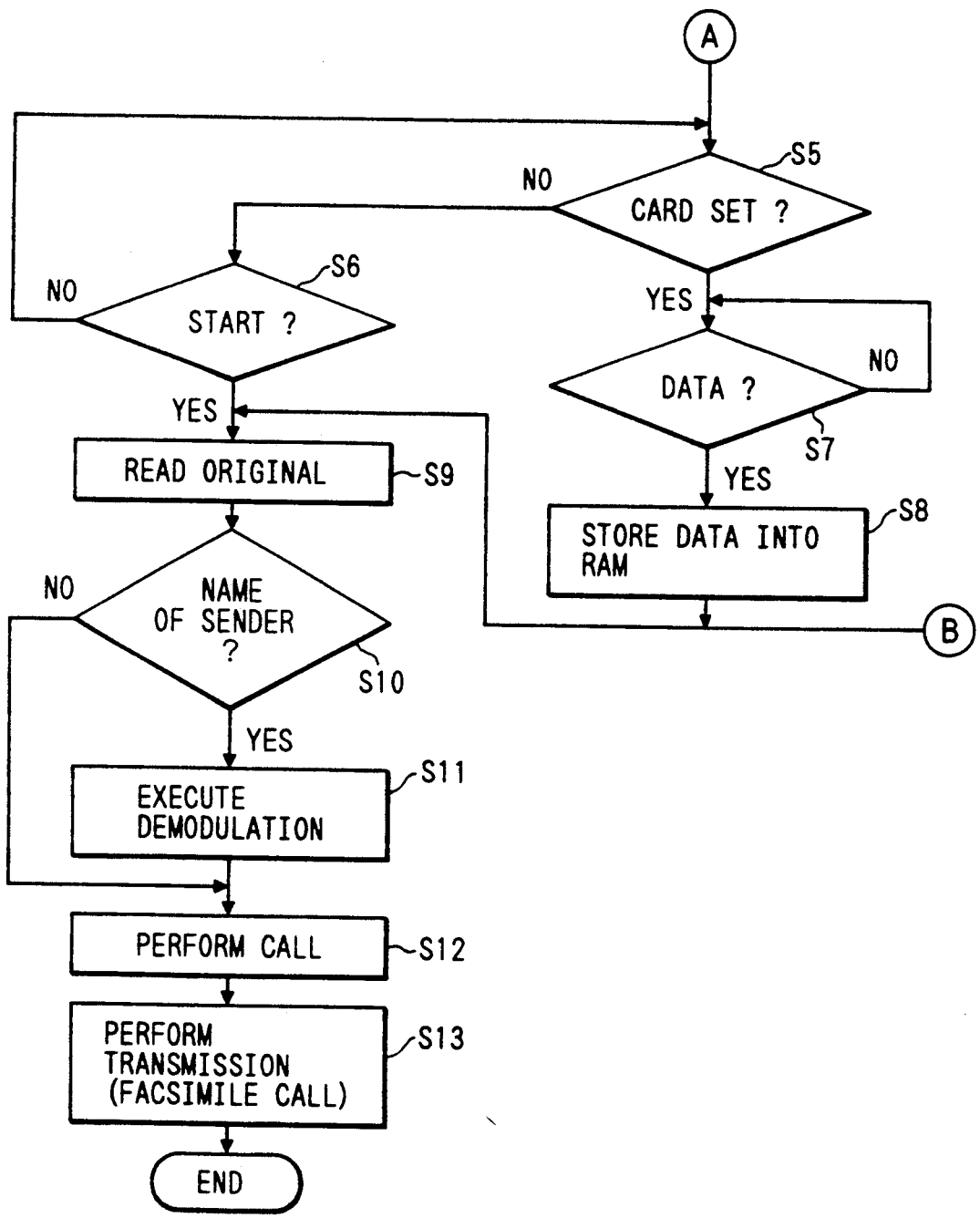
FIG. 13 is a flow chart showing processing of the facsimile apparatus of the third embodiment.

FIG. 13 shows a processing sequence in which a host apparatus (FAX) of the system of this embodiment performs call generation and addressing on the basis of data received from the electronic data memorandum. In a wait state in step S1, a CPU 43 waits until a facsimile transmission original is set (step S2) or the electronic data memorandum (card) 30 is set (step S3). Whether or not an original is set can be detected by a sensor of a read unit. If it is determined in step S2 that an original is set on the read unit, the CPU 43 sets the first page of the original at a predetermined position even if the original consists of a plurality of pages (step S4). It is checked in step S5 if the card 30 is set, and it is checked in step S6 if a one-touch dial button or the like on an operation panel (45 in FIG. 10) is operated to instruct transmission. The CPU 43 then waits for inputs.

If the card 30 is set, the switch 38 is turned on, and the CPU 43 determines YES in step S5 upon reception of this signal. In step S7, the CPU 43 waits for data from the card 30. When a dial start key 2-1 of the card 30 is depressed to send data, the data is photoelectrically converted by a photoreception sensor unit 37, and is stored in a memory (RAM) 41 (step S8). The CPU 43 reads out the first page or a plurality of pages of the original from the read unit, and stores the readout data on the memory (RAM) 41 as bit images (step S9). It is then checked if sender's name data are preset in the FAX main body (step S10). If YES in step S10, the preset data is demodulated to a bit image using a character pattern stored in a memory (ROM) 42, and stores it at the start portion of the image data input from a read unit 46 and stored in the memory (RAM) 41 (step S11). The modem 40 is driven on the basis of the dial number stored in step S8 to execute call generation processing (step S12), and so-called facsimile call is performed with a destination station (called party) (step S13).

If NO in step S2, and if YES in step S3, that is, if the card 30 is set and no original is set, the CPU 43 waits for data from the card in step S14. If YES in step S14, the CPU 43 stores dial number data in the memory,(RAM) 41 (step S15), and waits until an original is set in step S16. If YES in step S16, processing for setting an original at the predetermined position is executed as in step S4 (step S18), and the flow advances to step S9 to execute the same processing as described above.

If NO in step S14, the CPU 43 waits until an original is set (YES in step S17). If YES in step S17, the flow advances to step S4 to execute the same processing as described above.

In steps S16 and S17, the CPU 43 waits until an original is set. A timer processing step may be added after these decision steps, and if no FAX communication text is set over a predetermined period of time, an alarm or the like may be generated.

In this embodiment, a telephone number is sent from the electronic data memorandum to the telephone set. Alternatively, an identification number for restricting use may be transmitted from the electronic data memorandum to the telephone set, and the CPU 43 may restrict use according to the input identification number. Such use restriction may be applied not only to a telephone set but also to, e.g., a copying machine.

Fourth Embodiment

Figure 14:
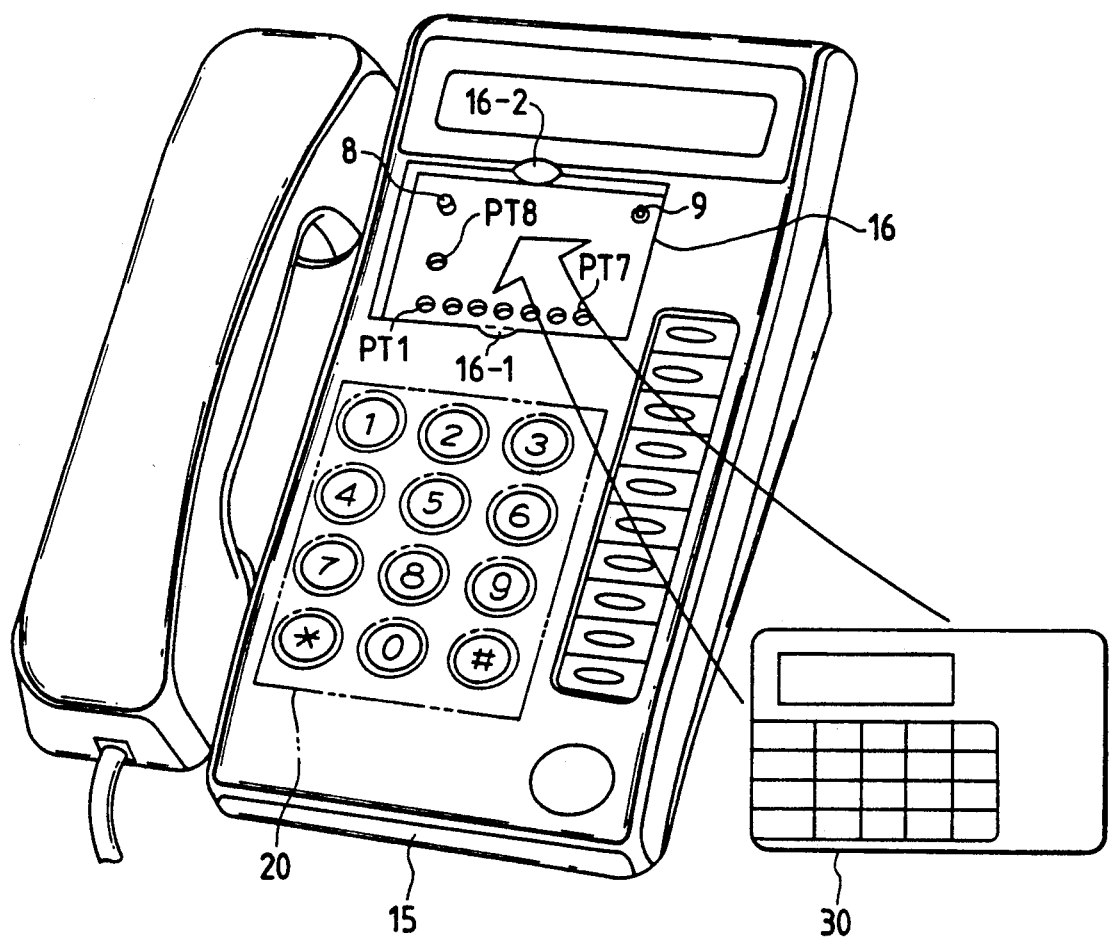
FIG. 14 is a top view of a telephone set according to the fourth embodiment of the present invention.

FIG. 14 shows an outer appearance of a telephone set which can receive both parallel and serial data from an electronic data memorandum 30. A recess portion 16 is formed in a telephone set 15 to position and fix the electronic data memorandum 30. Notches 16-1 and 16-2 are formed in portions of the recess portion 16 to facilitate setup/removal of the electronic data memorandum 30. Photoreception sensor units PT1 to PT7 are arranged for an electronic data memorandum which outputs signals in a 2 of 7 mode. A photoreception sensor unit PT8 is used for an electronic data memorandum which outputs serial signals. A switch 8 detects whether or not the electronic data memorandum is set on the recess portion 16. When the electronic data memorandum is set, the switch 8 is turned on to enable the photoreception sensor units PT1 to PT7 or PT8. A switch 9 discriminates whether a set electronic data memorandum employs a 2 of 7 mode or a serial mode, and switches a communication mode depending on a recess portion which may be formed (electronic data memorandum of the 2 of 7 mode) or may not be formed (electronic data memorandum of the serial mode) at a position corresponding to the switch 9.

Figure 15:
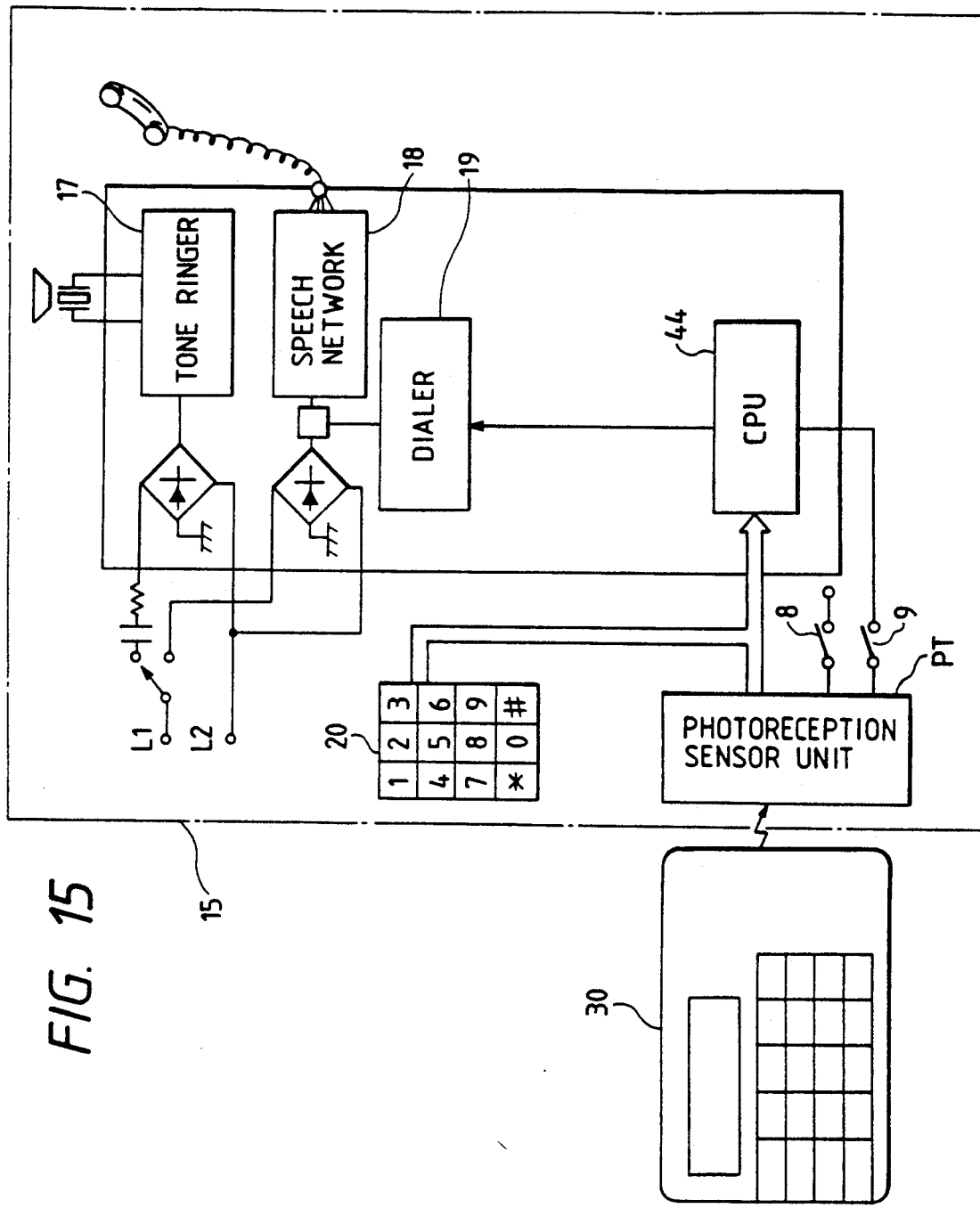
FIG. 15 is a block diagram of the telephone set of the fourth embodiment.

FIG. 15 shows the arrangement of the telephone set of this embodiment. A CPU 44 processes outputs from the photoreception sensor units PT as parallel data when the switch 9 is kept OFF, and controls a dialer 19 to generate a call. On the other hand, the CPU 44 processes outputs from the photoreception sensor units PT as serial data when the switch 9 is turned on, and causes the dialer 19 to generate a call.

The serial communication photoreception sensor unit PT8 need not be arranged in addition to the parallel communication photoreception sensor units PT1 to PT7. In this case, serial data may be received by one of the photoreception sensor units PT1 to PT7.

As shown in FIG. 14, when the serial communication photoreception sensor unit PT8 is arranged in addition to the parallel communication photoreception sensor units PT1 to PT7, the CPU 44 can identify which sensors receive light, so that the switch 9 can be omitted.

Even when the photoreception sensor units are commonly used in parallel and serial communications, the CPU 44 can identify a difference between the data formats of the parallel and serial communications, and can accurately generate a call without using the switch 9.

Therefore, the telephone set of this embodiment can utilize both an electronic data memorandum which outputs parallel dial number data, and an electronic data memorandum which outputs serial dial number data.

In this embodiment, data received from an electronic data memorandum by the telephone set is not limited to a telephone number but may be a use restriction identification number. A host apparatus which receives such an identification number is not limited to a telephone set but may be, e.g., a copying machine.

Fifth Embodiment

Figure 16:
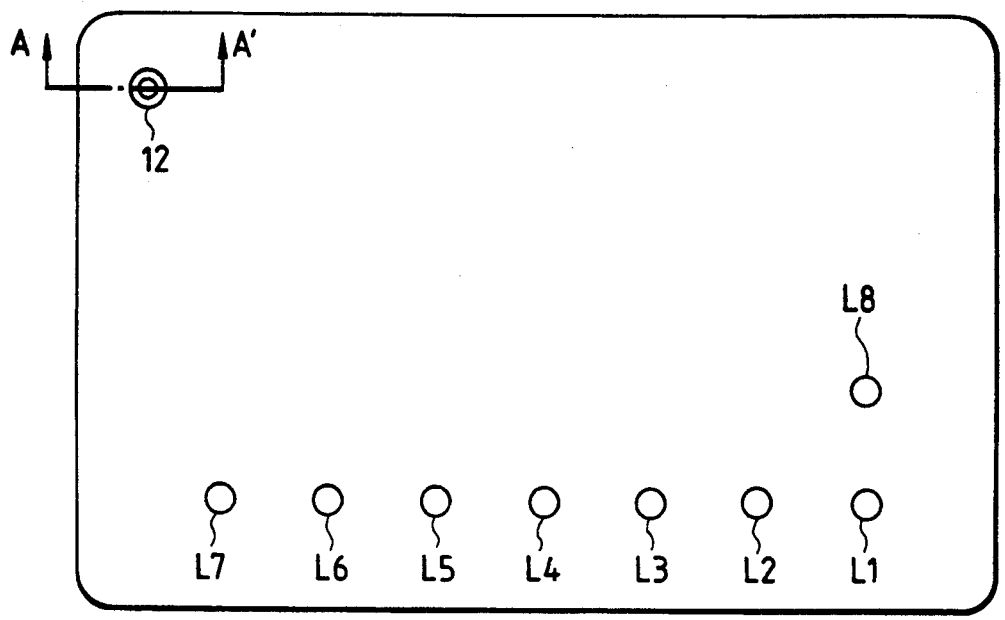
FIG. 16 is a bottom view of an electronic data memorandum according to the fifth embodiment of the present invention.

FIG. 16 is a bottom view of an electronic data memorandum which can be used in both a facsimile apparatus and a telephone set which receive data in a 2 of 7 mode, and a facsimile apparatus and a telephone set in a serial mode. Photoelectric conversion elements L1 to L7 output signals of the 2 of 7 mode, and an electro-optical conversion element L8 such as an LED outputs a serial data signal. A switch 12 switches a signal output mode between the serial and 2 of 7 modes, and detects a mode of a light reception unit of a facsimile apparatus or a telephone set according to whether or not a projection is formed at a position, corresponding to the switch 12, of a facsimile apparatus or a telephone set. That is, assuming that a projection is formed on a facsimile apparatus or a telephone set having a light reception unit of the 2 of 7 mode, when the electronic data memorandum is set on the facsimile apparatus, the switch 12 is turned on, and a memorandum 50 outputs a signal of the 2 of 7 mode. When the memorandum 50 is set on a facsimile apparatus or a telephone set having no projection, it outputs a signal of the serial mode since the switch 12 is not turned on.

Figure 17:
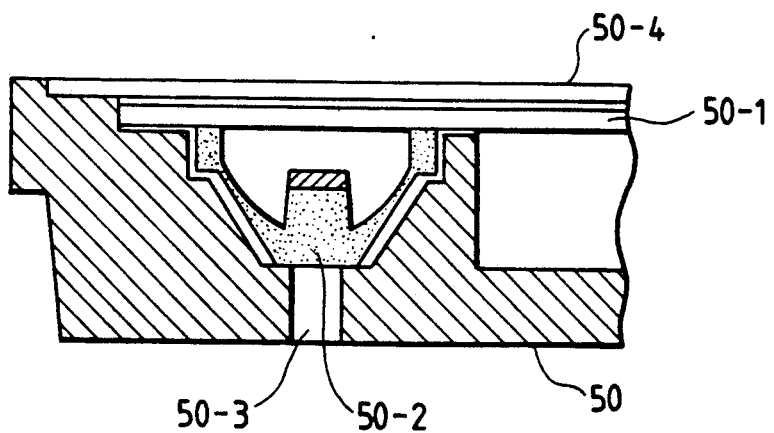
FIG. 17 is a sectional view of the electronic data memorandum of the fifth embodiment.

FIG. 17 is a sectional view of the switch 12 taken along a line A—A' in FIG. 15. A rubber switch 50-2 is depressed by the projection formed on the facsimile apparatus or the telephone set through a hole 50-3 formed in a main body, and a pattern (not shown)

formed on a printed board 50-1 is turned on. When this switch is turned on, the electronic data memorandum outputs a signal of the 2 of 7 mode. The memorandum 50 includes a key sheet film 50-4.

Figure 18:
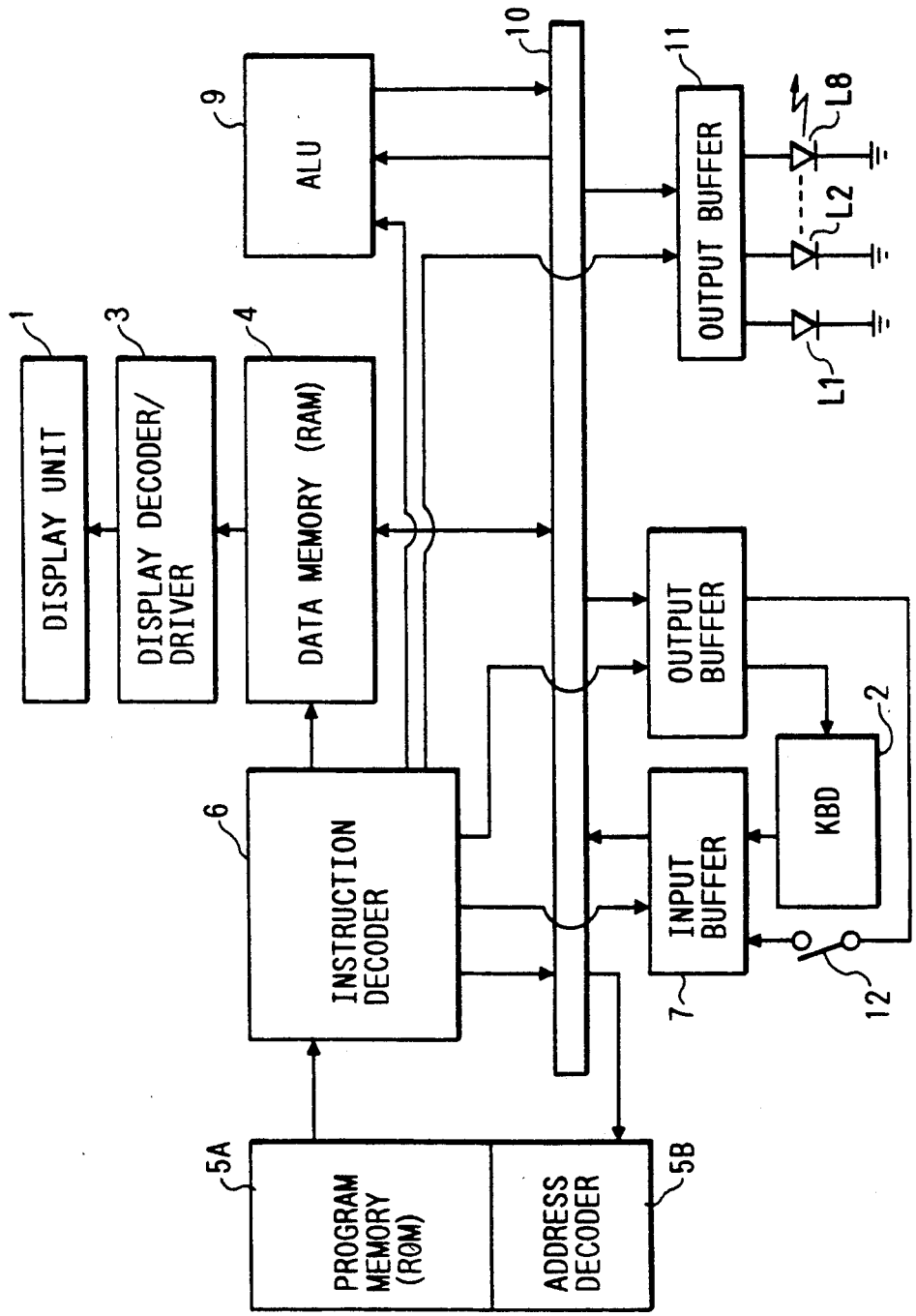
FIG. 18 is a block diagram of the electronic data memorandum of the fifth embodiment.

FIG. 18 shows an arrangement of the electronic data memorandum of this embodiment. When a dial number output instruction is issued from a keyboard 2 while the switch 12 is turned on, an instruction decoder 6 controls the elements L1 to L7 to output dial number data as parallel data. On the other hand, when the dial number output instruction is issued from the keyboard 2 while the switch 12 is turned off, the instruction decoder 6 controls the element L8 to output dial number data as serial data.

In the fifth embodiment, seven electro-optical conversion elements are used for the parallel mode, and one electro-optical conversion element is used for the serial mode. However, one of the parallel mode elements may be commonly used as a serial mode element to decrease the number of elements.

A photoelectric conversion element may be arranged on the electronic data memorandum, and a light-emitting element may be arranged on a facsimile apparatus or a telephone set, so that the facsimile apparatus or the telephone set may designate a data format of the electronic data memorandum using light signal.

Transmission data is not limited to a telephone number but may be a use restriction identification code. In this case, a data destination is not limited to a communication apparatus such as a telephone set, but may be, e.g., a copying machine.

Sixth Embodiment

In this embodiment, the electronic data memorandum of the above embodiment is provided with extra specifications such as an electronic calculator function (calculator mode), a timepiece function (timepiece mode), and the like in addition to a function of storing names and telephone numbers, and reading out the stored telephone number (Tel mode). In this case, when the electronic data memorandum is caused to perform a call generation operation of a host apparatus, a data memorandum mode must be set first, a name to be called (dial number data) must be searched and set in the host apparatus, and then, a call generation start instruction must be issued. Therefore, when a user wants to make a call at a telephone set in a hurry, it is very cumbersome to set the data memorandum mode. It is still more cumbersome when the electronic data memorandum is as small as a credit card to be convenient for carrying and small keys are not easy to operate. This embodiment can solve this problem.

Figure 19:
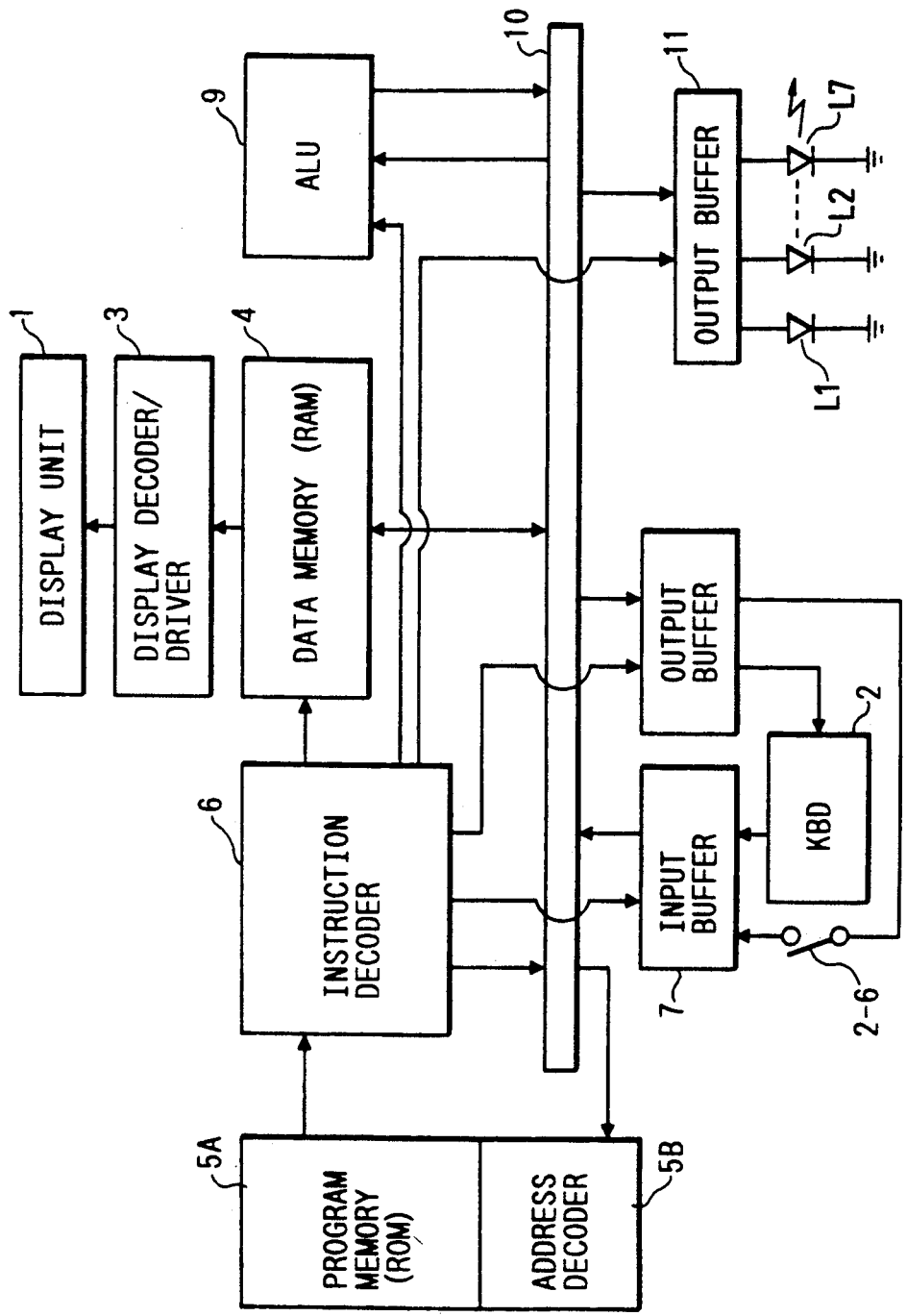
FIG. 19 is a block diagram of an electronic data memorandum according to the sixth embodiment of the present invention.
Figure 20:
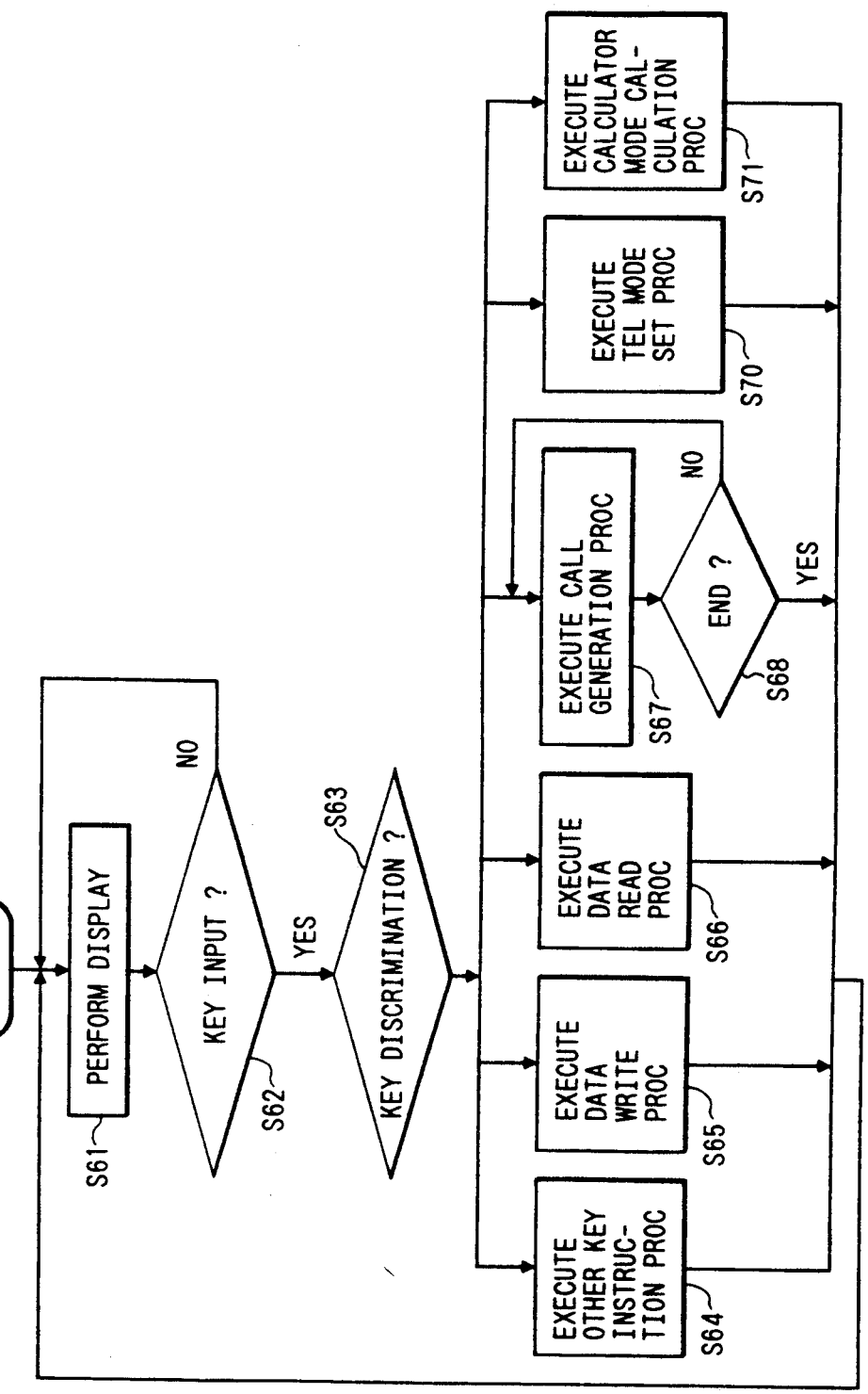
FIG. 20 is a flow chart showing processing of the electronic data memorandum of the sixth embodiment.

FIG. 19 shows an arrangement of an electronic data memorandum 30. In the arrangement shown in FIG. 19, a switch 2-6 for detecting that the memorandum 30 is set is added to the arrangement shown in FIG. 5. FIG. 20 shows a processing sequence of the memorandum. Steps S61 to S68 in FIG. 20 are common to those in FIG. 6.

When a menu key 2-5 (FIG. 4) is depressed in step S63, the calculator mode and the Tel (telephone) mode are alternately switched in other key instruction processing in step S64. When the calculator mode is set, various calculation processing operations corresponding to depressed keys are executed in step S71. When an instruction decoder 6 detects in step S63 based on an ON state of the switch 2-6 that the memorandum 30 is set on the host apparatus, it forcibly sets the Tel mode (step S70). In the Tel mode, the instruction decoder 6 searches or transmits data according to a key input.

FIG. 21 shows the lower surface of the electronic data memorandum 30. Light-emitting diodes (LEDs) L1 to L7 are arranged on the lower surface of the memorandum 30 to output light signals. When the memorandum 30 is set on the host apparatus, the switch 2-6 detects this to set the Tel mode. FIGS. 22A to 22C are sectional views taken along a line A—A' in FIG. 21, and show states wherein the switch 2-6 is turned on when the electronic data memorandum is set on a telephone set 15. FIG. 22A shows state immediately before the electronic data memorandum is set. A projection 15-2 formed on the telephone set 15 as a host apparatus is coupled to an arm 15-1 having a fulcrum 15-4 through a pin 15-5. The projection 15-2 is lightly pushed upward by a spring 15-6, and is no longer moved upward at a portion 15-7 of an outer case of the telephone set 15. When the electronic data memorandum is pushed downward (FIG. 22B), the projection 15-2 turns on the switch 2-6 arranged on a PCB 30-1. The electronic data memorandum is fitted in a recess portion 16 formed on the telephone set 15 until a projecting portion 15-3 formed on the arm 15-1 is brought into contact with the electronic data memorandum while the switch 2-6 is kept ON. The projecting portion 15-3 of the arm 15-1 is pushed downward by the electronic data memorandum while being in contact with the electronic data memorandum until the electronic data memorandum reaches the bottom of the recess portion 16 (FIG. 22C). Therefore, the projection 15-2 is pushed downward about the fulcrum 15-4, thereby turning off the switch 2-6.

In this manner, since the detection switch 2-6 is turned on when the electronic data memorandum is set on the host apparatus, processing for setting the Tel mode can be forcibly started in response to an ON signal of the switch 2-6.

Figure 23:
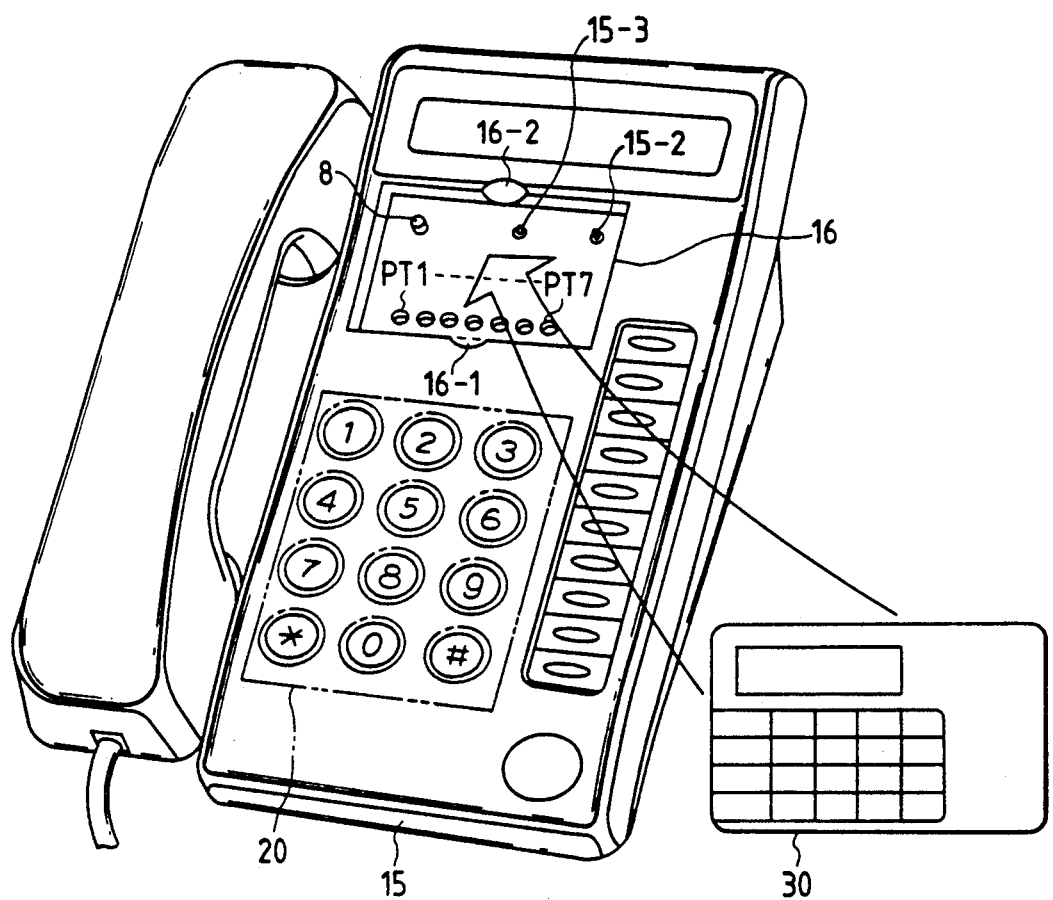
FIG. 23 is a top view of a telephone set of the sixth embodiment.

FIG. 23 shows the outer appearance of the telephone set for performing a call generation operation upon reception of dial number data stored in the electronic data memorandum. The telephone set shown in FIG. 23 has the projection 15-2 for turning on the switch 2-6 when the electronic data memorandum is set, and the auxiliary projecting portion 15-3 in addition to the telephone set shown in FIG. 1.

Figure 24:
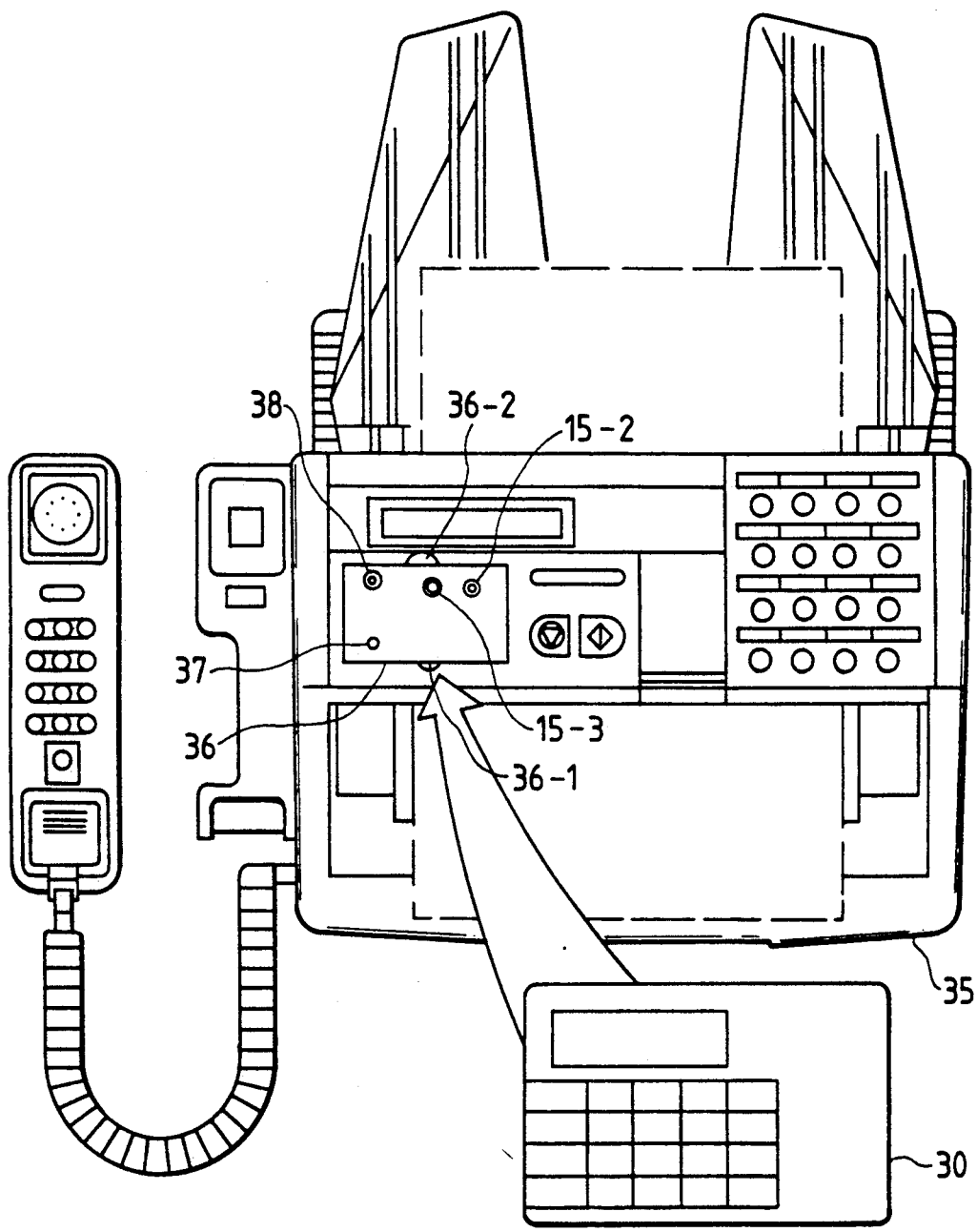
FIG. 24 is a top view of a facsimile apparatus of the sixth embodiment.

FIG. 24 shows the outer appearance of a facsimile apparatus for performing a call generation operation upon reception of dial number data stored in the electronic data memorandum. The facsimile apparatus shown in FIG. 24 has the projection 15-2 for turning on the switch 2-6 for forcibly setting the Tel mode when the electronic data memorandum is set, and the auxiliary projecting portion 15-3 in addition to the facsimile apparatus shown in FIG. 10.

In this manner, according to the present invention, even when the electronic data memorandum is used in another mode, e.g., in the calculator mode, it need only be set on the telephone set or the facsimile apparatus to automatically set the Tel mode. Therefore, a very effective system which is free from cumbersome mode selection can be provided.

Figure 25B:
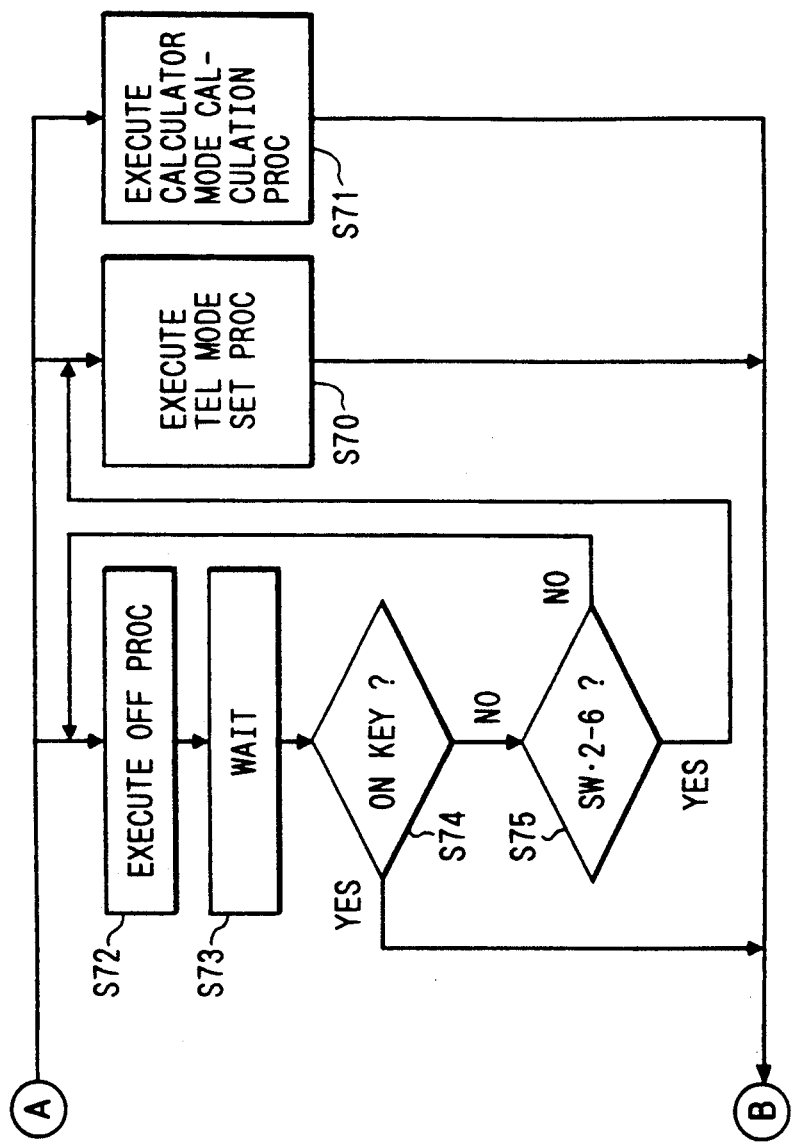
FIG. 25 is a flow chart showing processing of the electronic data memorandum of the sixth embodiment.

FIG. 25 shows another embodiment of a processing sequence for setting the Tel mode when the electronic data memorandum is set on the host apparatus. In addition to the processing steps shown in FIG. 20, even in an OFF state of the electronic data memorandum, when the electronic data memorandum is set on the host apparatus, its power switch is turned on, and the Tel mode is set.

More specifically, when an OFF key 2-7 (FIG. 4) is depressed, the instruction decoder 6 performs key discrimination in step S63, and executes OFF processing (step S72). In step S73, the instruction decoder 6 waits while a display unit 1 is kept OFF until a key is depressed. Even if a key is depressed, if the depressed key is other than an ON key 2-8 or the switch 2-6 for forcibly setting the Tel mode, NO is determined in ON key discrimination step S74, and NO is determined in switch 2-6 discrimination step S75. Thus, the OFF processing is executed again (step S72), and a wait state is set in step S73. If the ON key 2-8 is depressed, YES is determined in step S74, and the flow returns to step S61, thus resuming a normal operation.

When the electronic data memorandum is set on the host apparatus in an OFF state (the wait state in step S73) and the switch 2-6 is turned on, YES is determined in step S75, and the control directly advances to the Tel mode set processing (step S70). Upon completion of the mode set processing, an initial state of the Tel mode is set to accept a key instruction such as data search or transmission instruction.

Seventh Embodiment

When dial number data is transmitted from an electronic data memorandum to a facsimile apparatus or a telephone set through a connector or light signals, and a call generation operation is performed based on this data, if a called party has both the telephone set and the facsimile apparatus and they have different numbers, telephone and FAX numbers must be independently stored in the electronic data memorandum, and a user must selectively read out the FAX or telephone number in the facsimile or telephone communication.

In this embodiment, a set of telephone and FAX numbers are registered as unit data in the electronic data memorandum carried by a user. Whether the electronic data memorandum is set on the facsimile apparatus or the telephone set is discriminated, and a call is generated based on the discriminated dial number data. Therefore, an operator need not distinguish dial number data to be read out depending on the facsimile apparatus or the telephone set. An erroneous call caused by an erroneous operation of an operator can be prevented.

Figure 26:
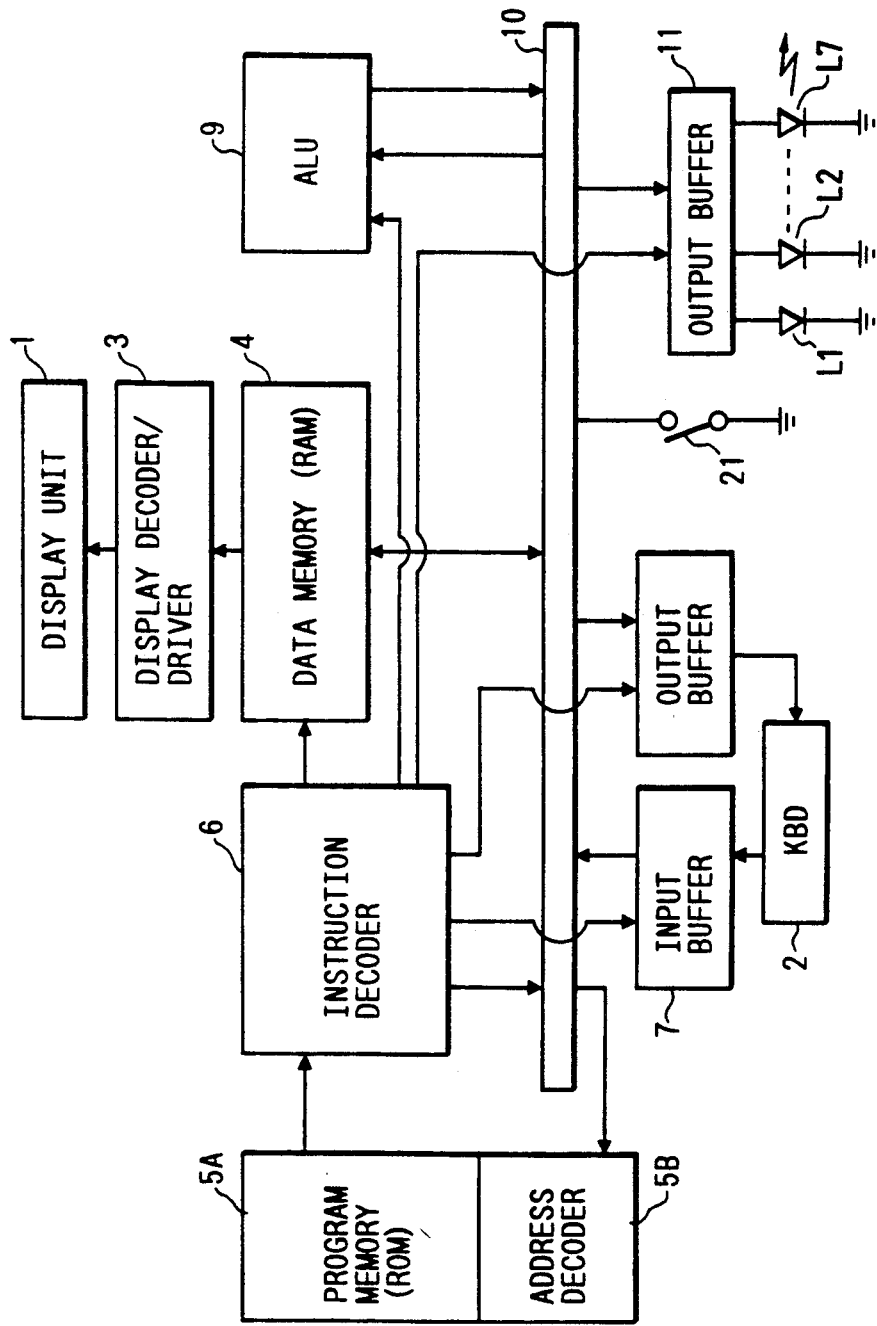
FIG. 26 is a block diagram of the electronic data memorandum of the sixth embodiment.

FIG. 26 shows an arrangement of the electronic data memorandum of this embodiment. In the arrangement shown in FIG. 26, a switch 21 which is turned on when the electronic data memorandum is set on the telephone set and is not turned on when it is set on the facsimile apparatus is provided to the arrangement shown in FIG. 5.

Figure 27:
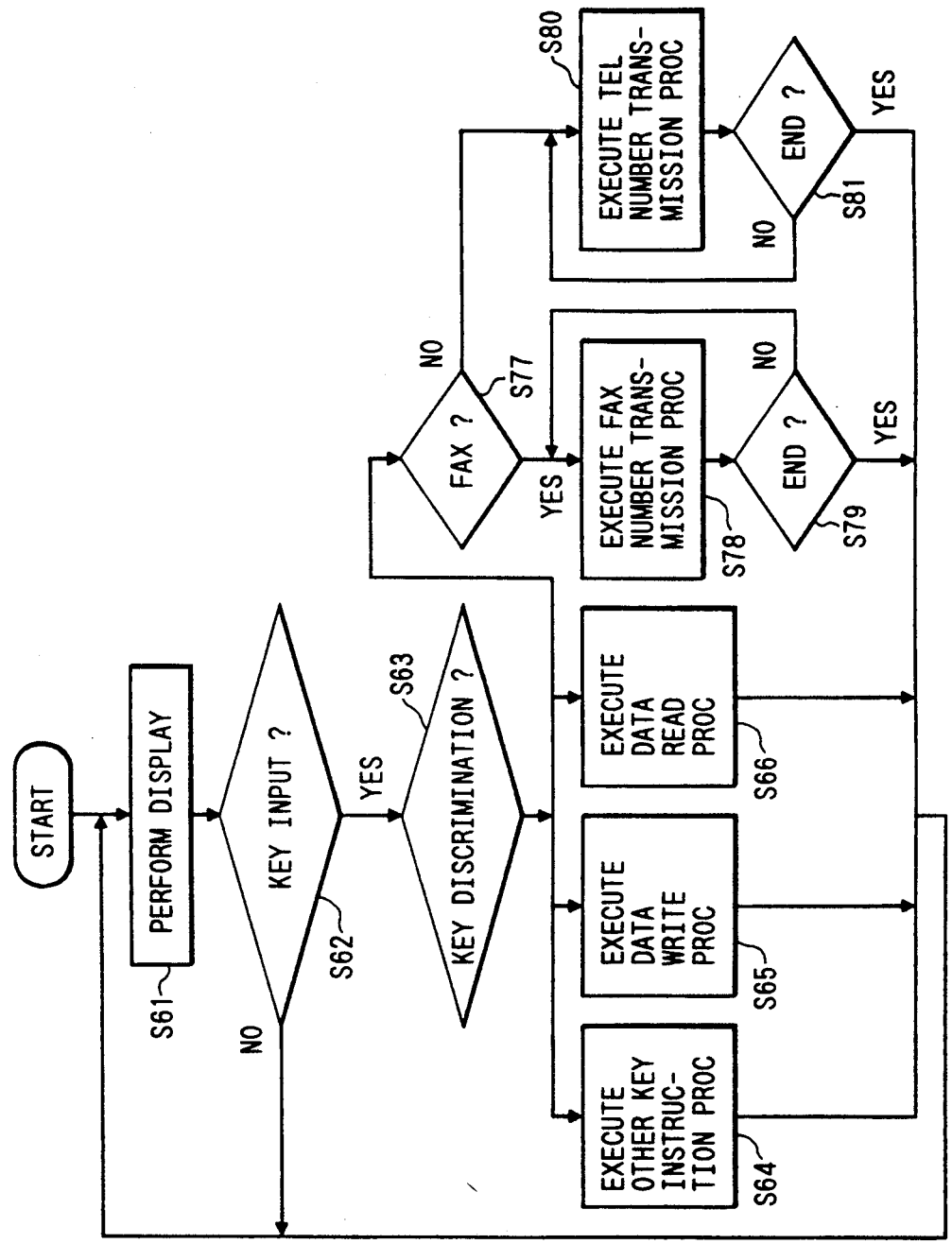
FIG. 27 is a flow chart showing processing of the electronic data memorandum according to the seventh embodiment of the present invention.

FIG. 27 shows a processing sequence of the electronic data memorandum of this embodiment. Steps S61 to S66 in FIG. 27 are common to those in FIG. 6.

Upon depression of a dial start key 2-1, an instruction decoder 6 determines dial number transmission processing, and checks in step S77 based on the state of the switch 21 whether the electronic data memorandum is set on the facsimile apparatus or not (it is set on the telephone set). If YES in step S77, a FAX number of registered data is transmitted in step S78. In this case, a telephone number, a pause symbol, and a FAX number are registered in the electronic data memorandum in a predetermined order (in this case, the instruction decoder 6 can select a number before or after the pause symbol), or identification symbols are added to telephone and FAX numbers to distinguish two dial number data. It is checked in step S79 if transmission of data to be transmitted is completed. If NO in step S79, the flow returns to step S78, and the next data is transmitted. The same operation is repeated until YES is determined in step S79.

When the electronic data memorandum is set on the telephone set, NO is determined in step S77, and telephone number data is transmitted in step S80. Steps S80 and S81 are repeated until data transmission is completed in the same manner as described above.

Figure 28:
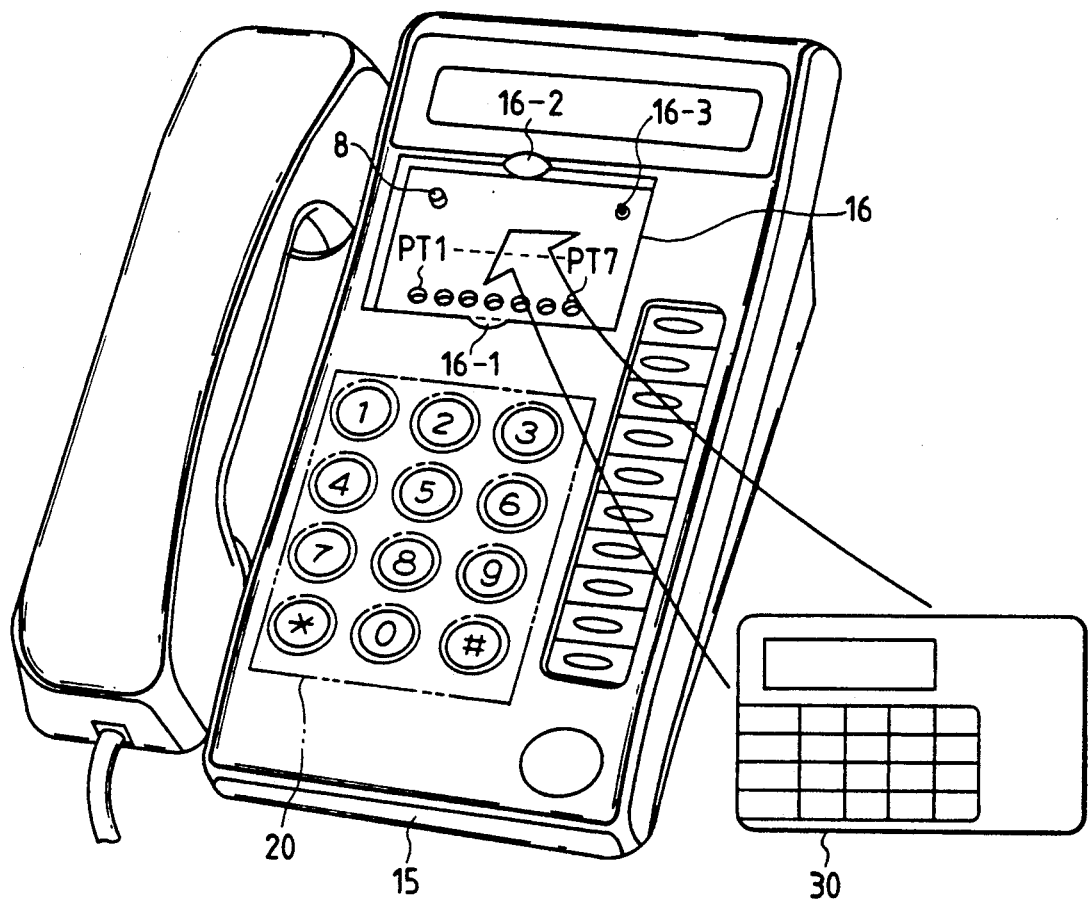
FIG. 28 is a top view of a telephone set of the seventh embodiment.

FIG. 28 shows an outer appearance of a telephone set for performing call generation processing upon reception of dial number data stored in the electronic data memorandum. In FIG. 28, a projection 16-3 for turning on the switch 21 of the electronic data memorandum is added to the arrangement shown in FIG. 1.

Figure 29:
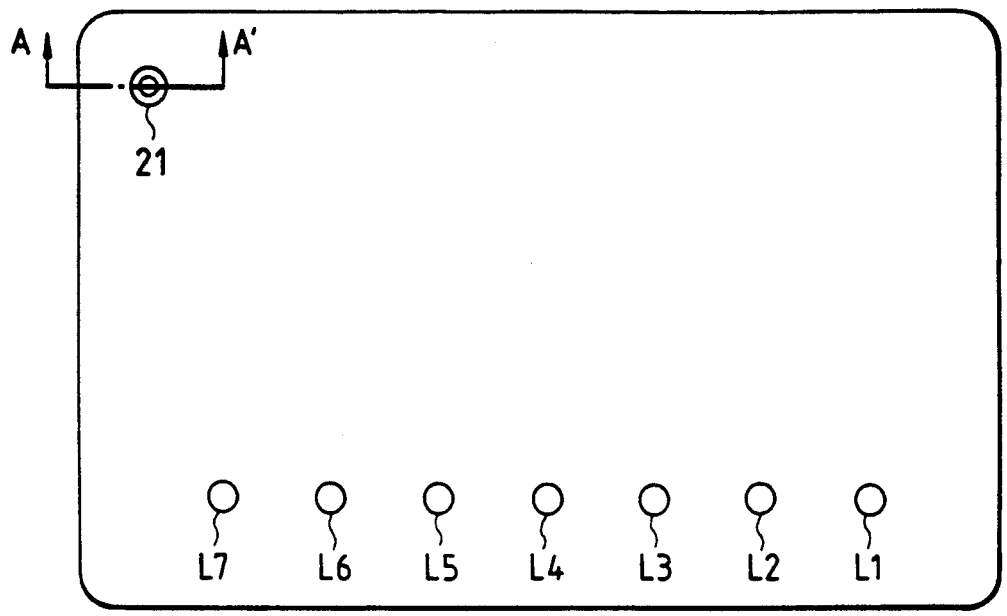
FIG. 29 is a bottom view of the electronic data memorandum of the seventh embodiment.

FIG. 29 is a bottom view of the electronic data memorandum. In FIG. 29, the switch 21 for discriminating whether the host apparatus is the telephone set or facsimile apparatus is arranged on the lower surface of the electronic data memorandum 30. Light generation units L1 to L7 output light signals described above. The electronic data memorandum identifies the host apparatus depending on whether a projection is formed on the facsimile apparatus or the telephone set in correspondence with the switch 21. More specifically, if this projection (16-3 in FIG. 28) is formed on the telephone set, the electronic data memorandum 30 can identify that the host apparatus is the telephone set since the switch 21 is turned on when the electronic data memorandum is set on the telephone set.

Figure 30:
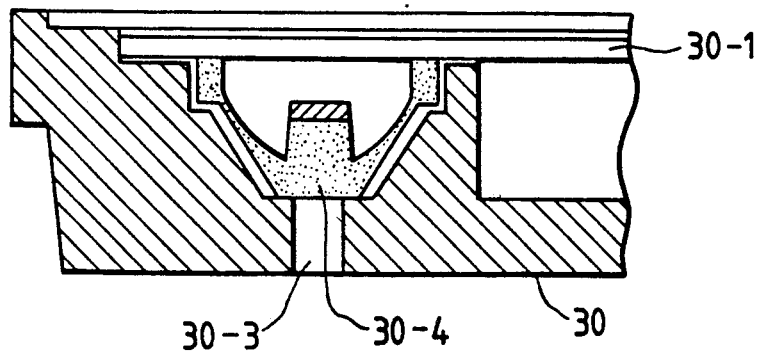
FIG. 30 is a sectional view of the electronic data memorandum of the seventh embodiment.

FIG. 30 is a sectional view of the switch 21 portion taken along a line A—A' in FIG. 29. A rubber switch 30-4 is pushed downward by the projection formed on the telephone set through a hole 30-3 formed in the memorandum 30, and a pattern (not shown) arranged on a printed board 30-1 is turned on. As a result, the electronic data memorandum can recognize that the host apparatus is the telephone set. The memorandum 30 includes a key sheet film 30-2.

When the electronic data memorandum is set on the facsimile apparatus shown in FIG. 10, the switch 21 is not turned on since the facsimile apparatus does not have a projection. Therefore, the electronic data memorandum can recognize that the host apparatus is the facsimile apparatus.

As described above, according to this embodiment, a name of a called party is read out from the electronic data memorandum, and the electronic data memorandum is set on the facsimile apparatus or the telephone set, so that a call can be generated regardless of the FAX or telephone number. More specifically, a very effective system which need not selectively read out a FAX or telephone number even for the same destination depending on facsimile or telephone communication, can be provided.

Figure 31:
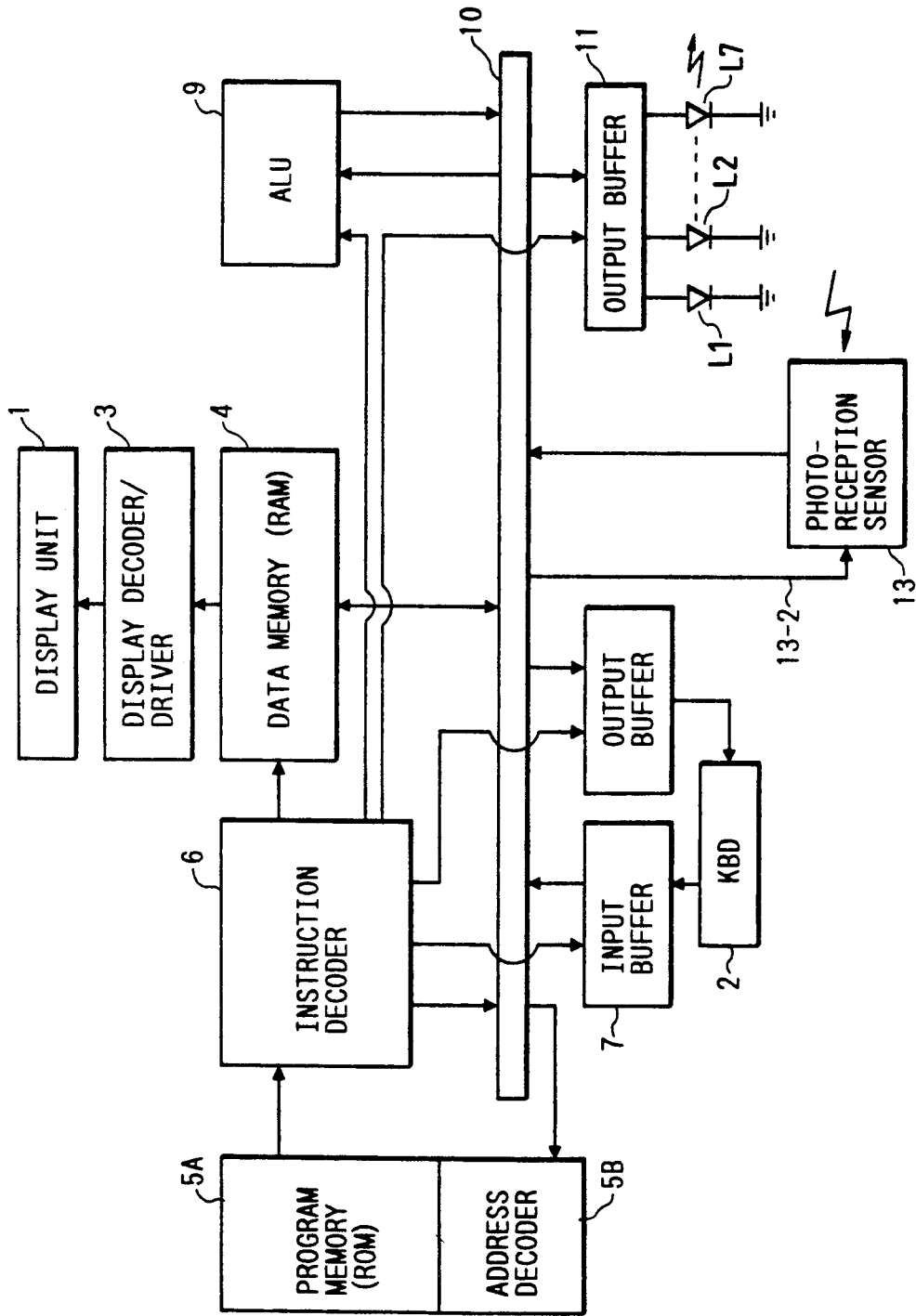
FIG. 31 is a block diagram of the electronic data memorandum of the seventh embodiment.
Figure 32:
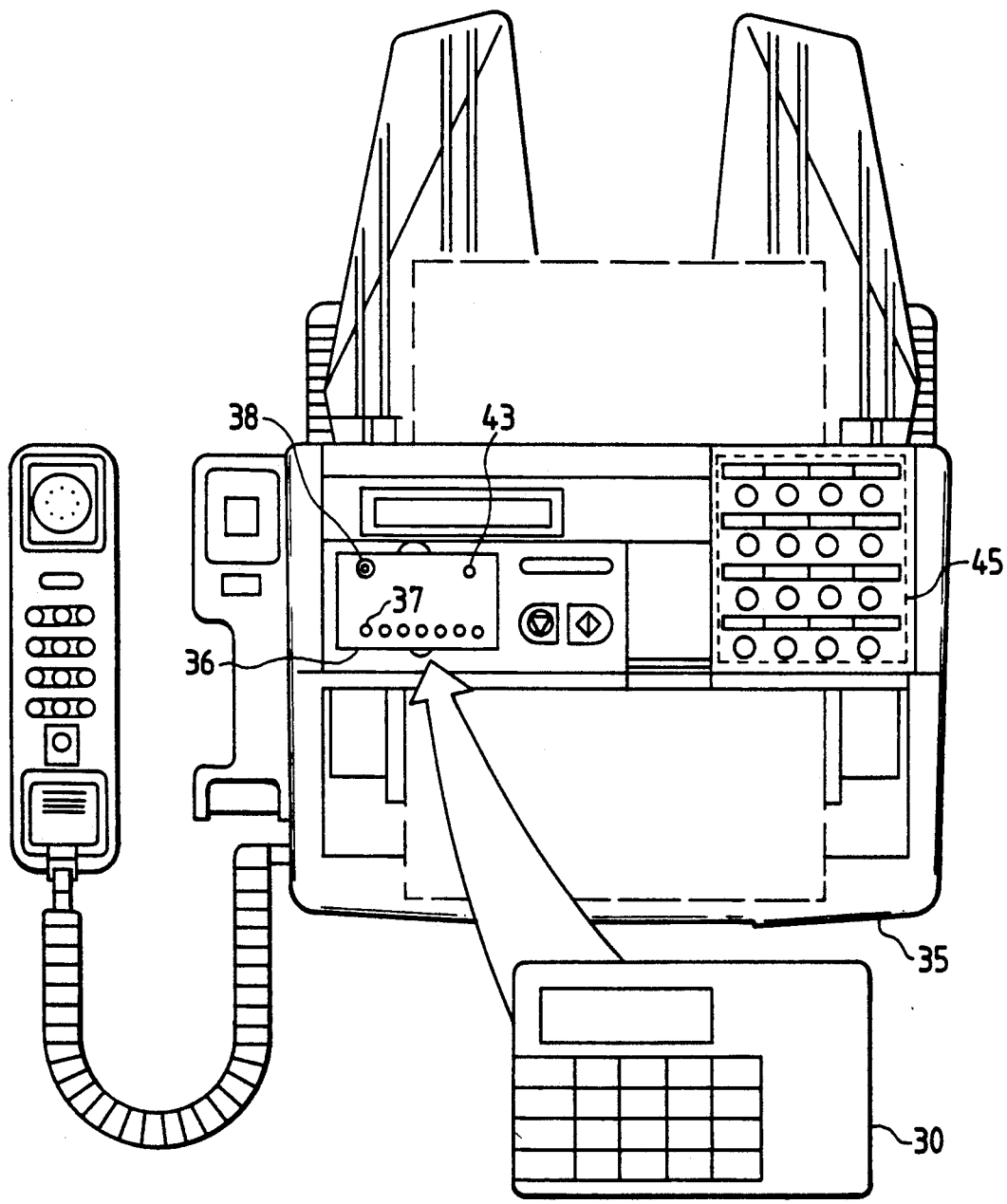
FIG. 32 is a top view of a facsimile apparatus of the seventh embodiment.

FIG. 31 is a block diagram of an electronic data memorandum of an embodiment, which uses light signals to discriminate whether a host apparatus is a facsimile apparatus or a telephone set. In place of the switch 21 shown in FIG. 26, an identification light source, for example, a light-emitting element 43 such as an LED which emits light in cooperation with a detection switch 38 when an electronic data memorandum is set on, e.g., a facsimile apparatus, is provided to one of the facsimile or telephone set as a host apparatus. An instruction decoder 6 detects this light using a photoreception sensor 13, and can recognize that a host apparatus on which the electronic data memorandum is set is the facsimile apparatus.

A control terminal 13-2 is arranged to prevent an erroneous operation caused by disturbance light when the electronic data memorandum is not set on the host apparatus. When dial number data is sent to the host apparatus, i.e., when the dial start key 2-1 is depressed, whether a FAX or telephone number is output is determined based on the output from the photoreception sensor 13.

Eighth Embodiment

This embodiments aims at solving the problem common to the seventh embodiment. More specifically, in this embodiment, a set of telephone and FAX numbers are registered as unit data in an electronic data memorandum. A facsimile apparatus performs call generation processing using the FAX number of the telephone and FAX numbers sent from the electronic data memorandum. On the other hand, a telephone set performs call generation processing using the telephone number of the telephone and FAX numbers sent from the electronic data memorandum. Therefore, an operator of the electronic data memorandum need not distinguish dial number data to be read out depending on whether the electronic data memorandum is set on the facsimile apparatus or the telephone set. The arrangement and processing sequence of the electronic data memorandum of this embodiment are common to those shown in FIGS. 5 and 6.

If processing in step S65 is determined in step S63 in FIG. 5, numeral/character data input through the other instruction key processing routine in step S64 is written in a RAM 4 (FIG. 5). When a cursor is located in a character display portion 1—1 and a Tel mode is set, whether name data is written in alphabets or kana characters is selected using a kana/alphanumeric key 2—2 of the electronic data memorandum shown in FIG. 4. Then, character data is input using character keys 2-3 (FIG. 4). A cursor (not shown) is moved to a data display portion 1-2 using cursor keys 2-4 to set a numeral input state, and number data (numeral data) is input using the character keys 2-3 and a key 2-5 for designating a telephone or FAX number (FIG. 4). If data read processing is determined in step S63, data written in the RAM 4 is displayed on a display unit 1 (FIG. 5) in step S66.

If a dial start key 2-1 (FIG. 4) is depressed and dial number transmission processing is determined in step S63, an instruction decoder 6 drives LEDs according to data to be called (e.g., telephone number data, a pause code, and FAX number data read out from the RAM 4 to a display 1-2 in step S66) in step S67. It is checked in step S68 if all the data to be subjected to call generation processing are transmitted. If NO in step S68, the flow returns to step S67, and the next data is transmitted. The same operation is repeated until YES is determined in step S68.

Figure 33:
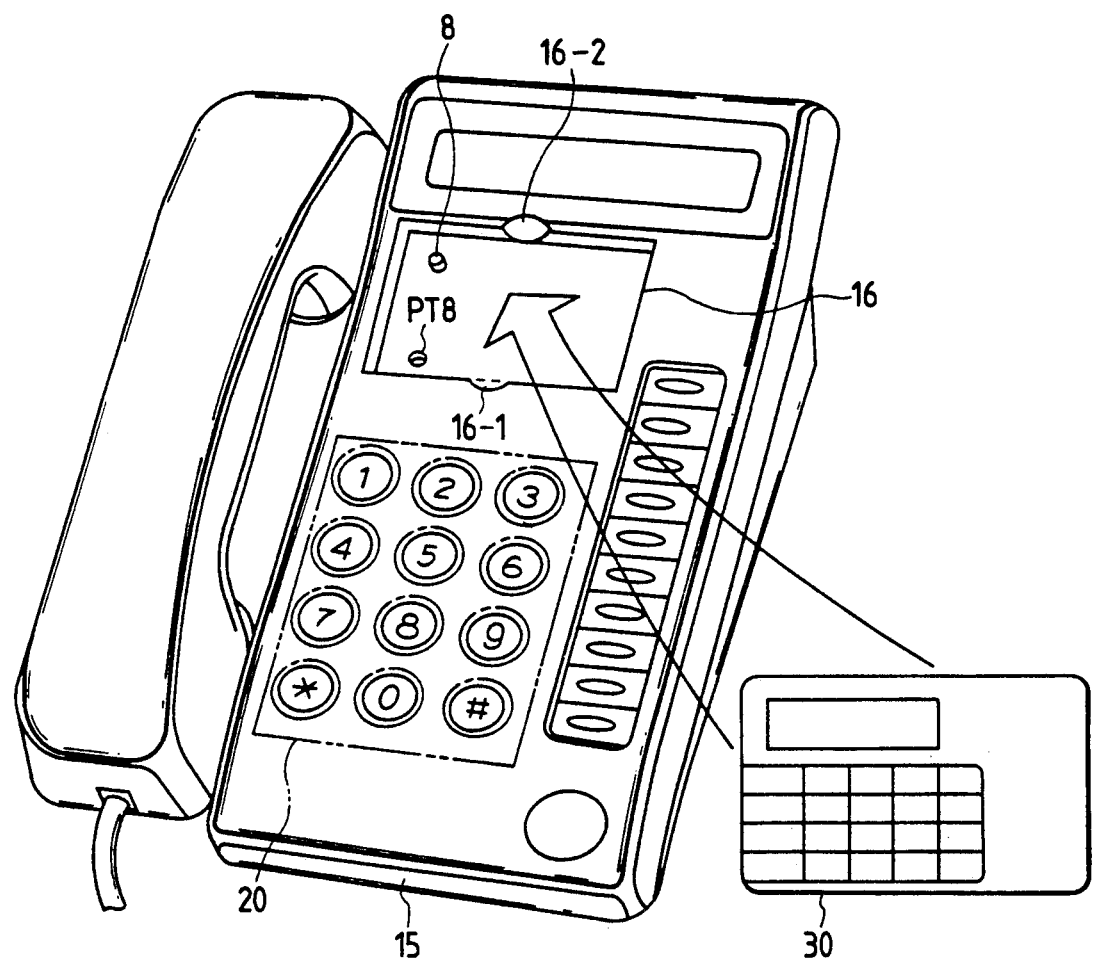
FIG. 33 is a top view of a telephone set according to the eighth embodiment of the present invention.

FIG. 33 shows an outer appearance of a telephone set for performing call generation processing upon reception of dial number data stored in the electronic data memorandum. A recess portion 16 is formed in a telephone set 15 to position and fix an electronic data memorandum 30. Notches 16-1 and 16-2 are formed in portions of the recess portion 16 to facilitate setup/removal of the electronic data memorandum 30. A photoreception sensor unit PT8 receives a light signal from the electronic data memorandum. A switch 8 is turned on when the electronic data memorandum 30 is set in the recess portion, thereby detecting that the electronic data memorandum 30 is set. When the switch 8 is turned on, the telephone set photoelectrically converts a light signal sent from the electronic data memorandum, and performs call generation processing on the basis of the received data.

Figure 34:
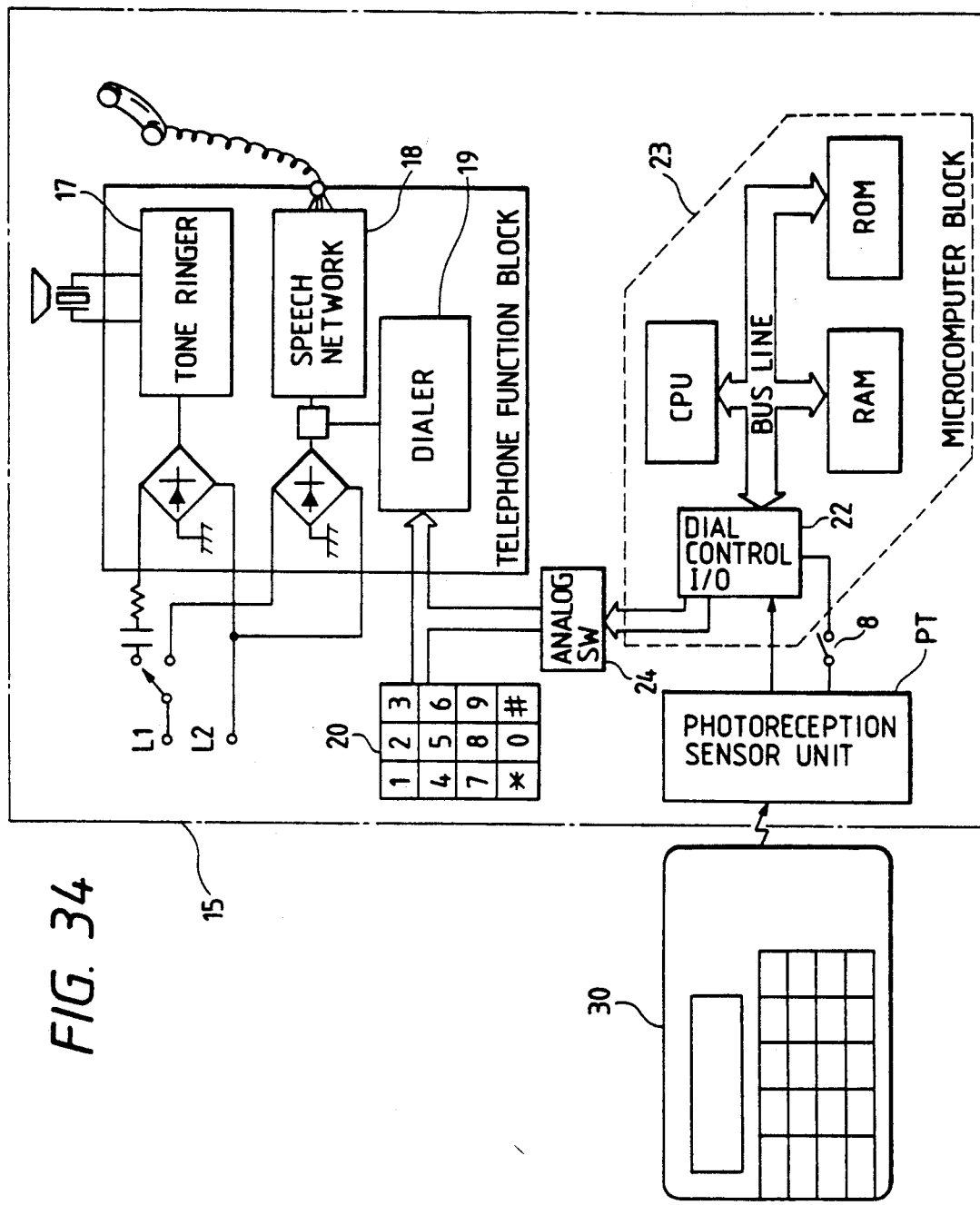
FIG. 34 is a block diagram of the telephone set of the eighth embodiment.

FIG. 34 is a block diagram showing a telephone function block. The telephone set shown in FIG. 34 includes a tone ringer 17, a speech network 18, and a dialer 19. In response to a key input from a dial key switch unit 20 or a signal from a sensor unit 21, a microcomputer block 23 executes call generation processing via a dial control I/0 (input/output unit) 22.

More specifically, upon reception of telephone and FAX numbers from the electronic data memorandum 30, the microcomputer block 23 drives an analog switch 24 through the dial control I/0 22 using required dial number data, thus causing the dialer 19 to execute call generation processing.

A signal from the electronic data memorandum 30 can have a data format similar to, e.g., RS-232C, and can send one dial number data using a start bit+data bits (4 bits)+a stop bit in a start-stop synchronization mode. As pause data of the telephone and FAX number data, one of 16 types of data expressed by 4 bits except for 12 types of dial number data "0" to "0" and symbols "*" and "#" can be assigned.

Figure 35:
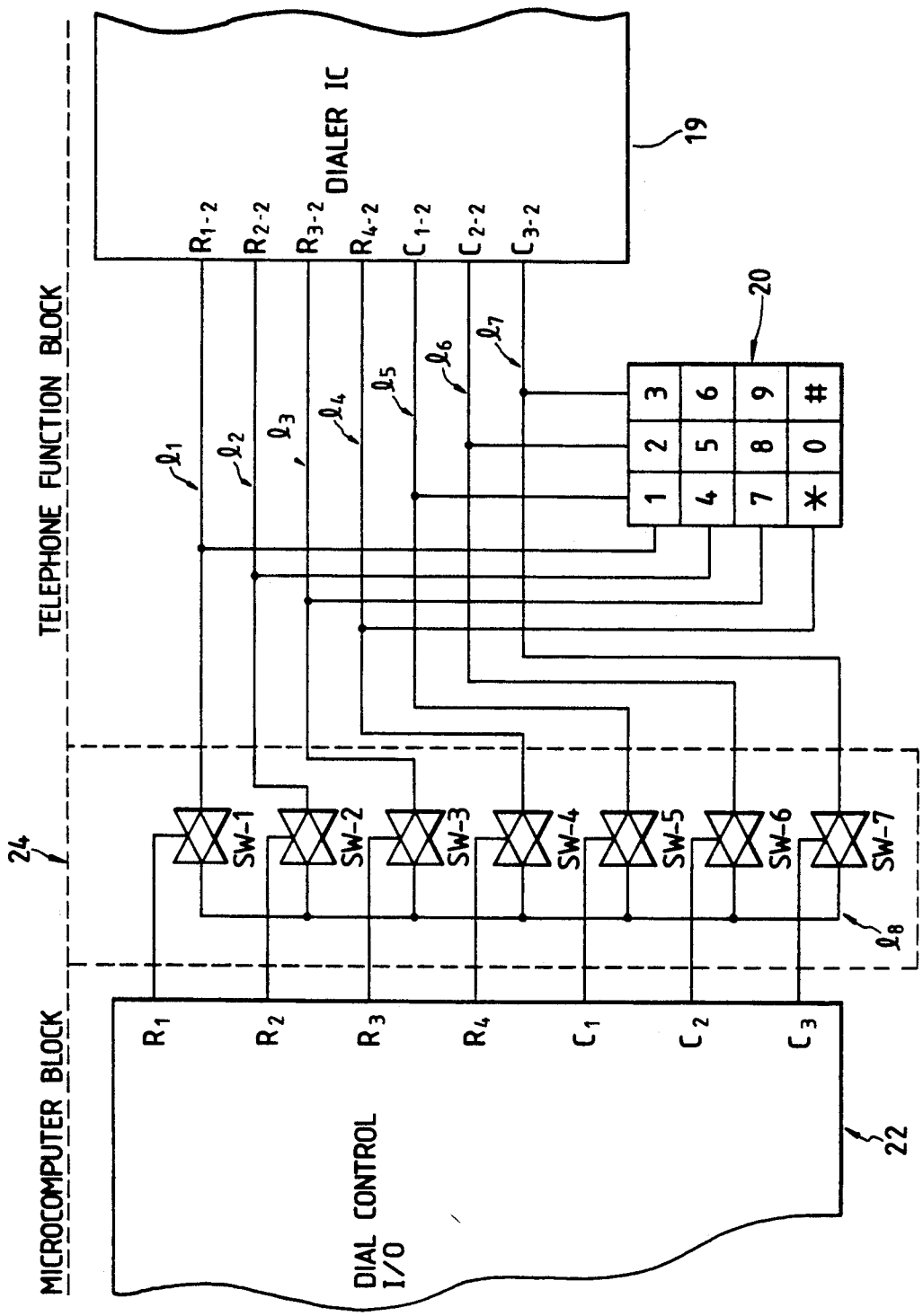
FIG. 35 is a circuit diagram of the telephone set of the eighth embodiment.

FIG. 35 is a circuit diagram when the dial control I/0 22 controls the dialer 19 through the analog switch 24. The dial control I/0 22 has control output terminals $R_1$, $R_2$, $R_3$, $R_4$, $C_1$, $C_2$, and $C_3$. An operation performed when dial transmission data "1, 2, 3, 4, 9, #" are transmitted will be described below with reference to the timing chart of FIG. 7. In order to transmit "1" as dial data, signals of a so-called 2 of 7 mode are output, i.e., coded signals are output during a time interval T1-a so as to set the output terminals $R_1$ and $C_1$ to be "1" and other output terminals to be "0". According to these outputs, the microcomputer 23 turns on analog switches SW-1 and SW-5 of the analog switch 24.

Lines 11 and 18 connected to the analog switch SW-1 and lines 15 and 18 connected to an analog switch SW-5 are enabled, and the lines 11 and 15 are connected to each other. This is equivalent to a state wherein a "1" key of the dial key switch unit 20 is depressed to enable (connect) the lines 11 and 15. In this manner, a "1" call generation instruction is input to the dialer 19.

During a time interval T1-b, all the outputs of the output buffer 11 are "0"s, and the lines 11 to 17 are set in an open state, i.e., are not connected to any line. This is equivalent to a state wherein the "1" key of the dial key switch unit 20 is released. Similarly, upon transmission of data "2", the lines 11 and 16 are enabled in response to the outputs $R_1$ and $C_2$ during a time interval T2-a. Upon transmission of data "3", the lines 11 and 17 are enabled in response to the outputs $R_1$ and $C_3$ during a time interval T3-a. The lines 12 and 15 are enabled in response to the outputs $R_2$ and $C_1$ during a time interval T4-a, the lines 13 and 17 are enabled in response to the outputs $R_3$ and $C_3$ during a time interval T5-a, and the lines 14 and 17 are enabled in response to the outputs $R_4$ and $C_3$ during a time interval T6-a. Thus, call generation data "1, 2, 3, 4, 9, #" are transmitted to the dialer 19, thus generating a call.

The arrangement of the facsimile apparatus of this embodiment is common to that shown in FIG. 11.

When a microcomputer system 39 detects based on a state of a switch 38 that the electronic data memorandum 30 is set, it causes a photoreception sensor 37 to photoelectrically convert a light signal sent from the electronic data memorandum 30. The microcomputer system 39 controls a modem 40 on the basis of FAX number data following telephone number data and a pause code, thus executing a call generation operation.

Figure 36A:
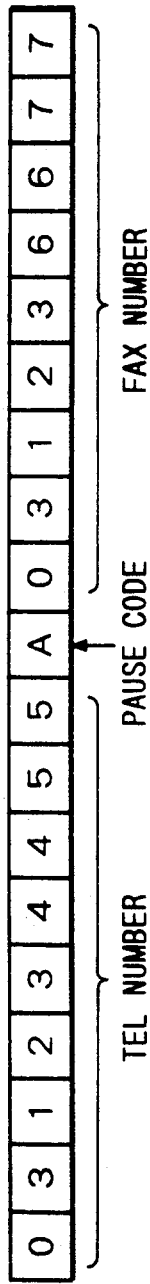
FIGS. 36A to 36D show data sent in the eighth embodiment.

FIGS. 36A to 36D show output data strings when the electronic data memorandum 30 adds identification codes telephone and FAX numbers, and output them to the telephone set or the facsimile apparatus as a host apparatus. FIGS. 36A to 36D exemplify a case of a telephone number of 03-123-4455 and a FAX number of 03-123-6677. FIG. 36A shows a data string having a predetermined order of a telephone number, a pause code "A", and a FAX number like in this embodiment.

Figure 36B:
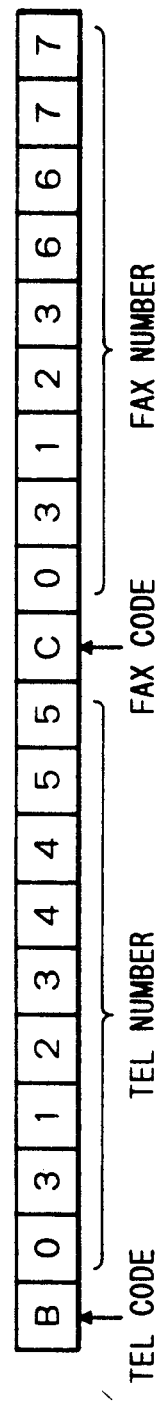
Figure 36C:
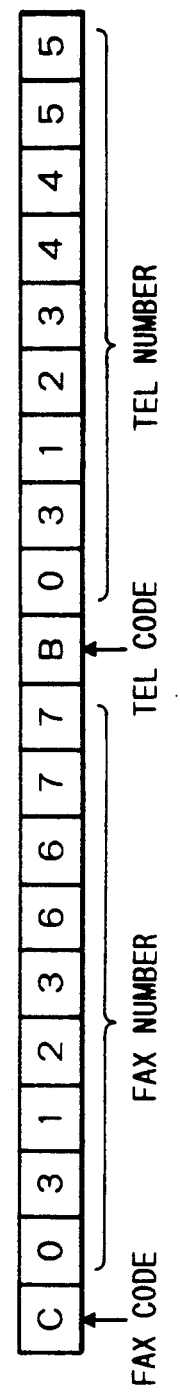
Figures 36D, 38:
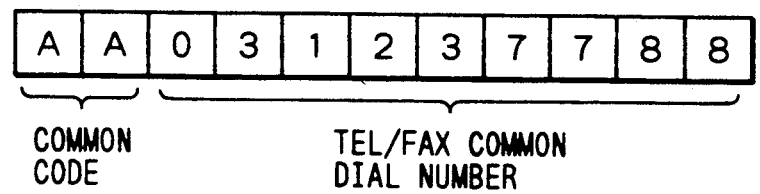
FIG. 38 shows data sent in the eighth embodiment.

FIGS. 36B and 36C show data strings when identification codes "B" and "C" are respectively assigned to telephone and FAX numbers. When the codes are assigned to the numbers in this manner, the dial numbers can be registered in the electronic data memorandum regardless of their orders. FIG. 36D shows a table when 4-bit codes, dial numbers, and symbols are assigned.

Figure 37:
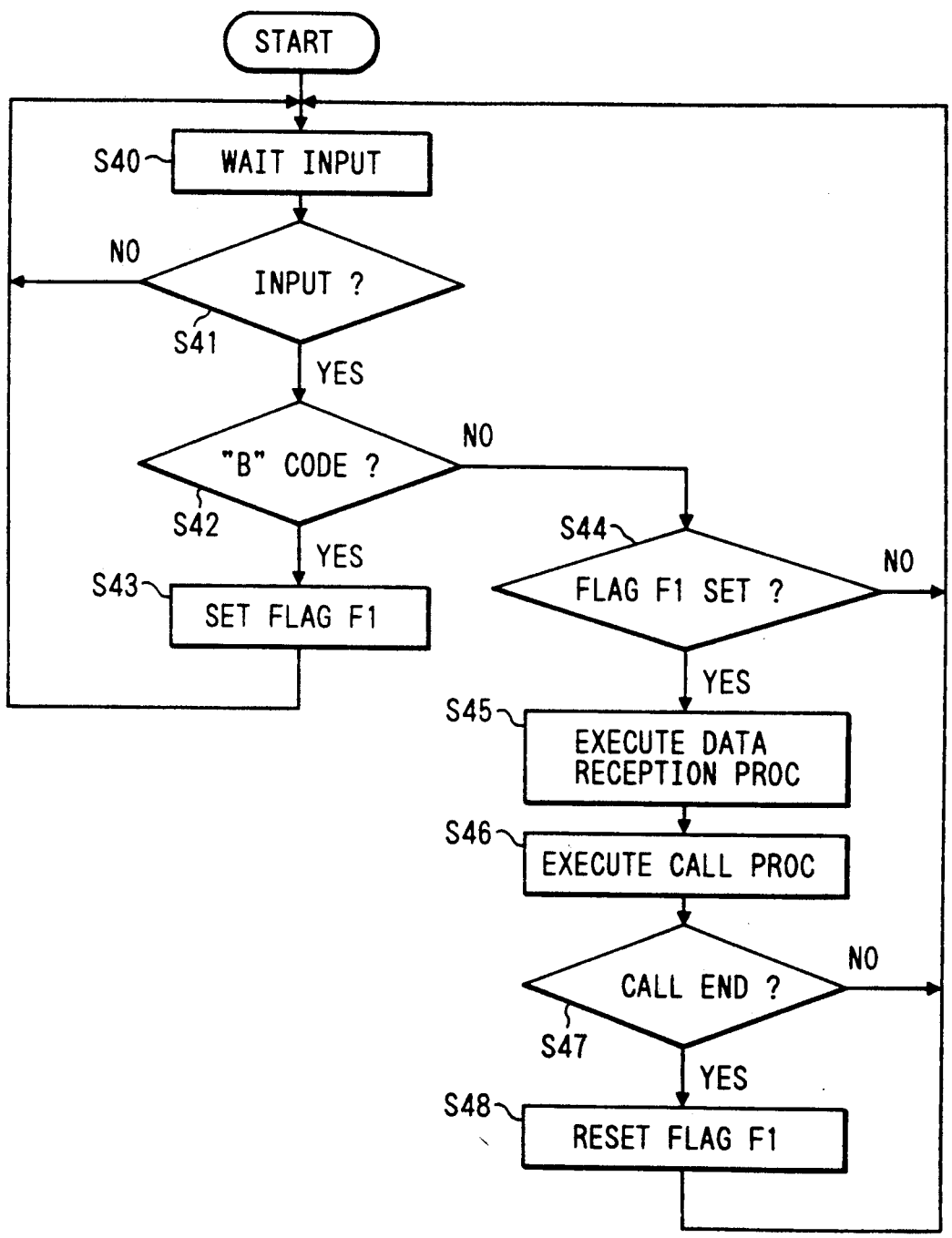
FIG. 37 is a flow chart showing processing of the telephone set of the eighth embodiment.

FIG. 37 is a flow chart for explaining a processing sequence of a telephone set which does not select required dial number data after all the data are received when telephone and FAX number data are sent from the electronic data memorandum, but recognizes an identification code to select whether or not data is received.

Step S40 corresponds to an input wait state. The microcomputer 23 of the telephone set checks in step S41 if the electronic data memorandum is set and a signal shown in FIG. 36B or 36C is input. If NO in step S41, the flow returns to step S40. If YES in step S41, it is checked in step S42 if the input code is a "B" code of the telephone number code. If YES in step S42, a flag F1 indicating that the following data is telephone number data is set in a RAM, and the flow returns to step S40 to prepare for the next data input processing. If NO in step S42, it is checked in step S44 if the flag F1 is set. If NO in step S44, the flow returns to step S40. Therefore, when a FAX code and a FAX number are input, NO is determined in both steps S42 and S44, and processing is executed in the loop of steps S40, S41, S44, and S40. Thus, the FAX number is not called.

When a telephone code is input and YES is determined in step S44, the microcomputer 23 receives dial number data in step S45, and executes call generation processing in step S46. It is checked if call data is ended (step S47). The same operation is repeated until YES is determined in step S47. If YES in step S47, the flag F1 is reset (step S48), and the flow returns to step S40. In this manner, since only a signal in the format of telephone code + telephone number can be subjected to call generation processing, unnecessary data need not be received and temporarily stored. A memory required for this can be efficiently used to store other data.

FIG. 38 shows a data string which can solve the following problem. That is, when a destination station has the same telephone and FAX number, i.e., when a facsimile apparatus is normally used in a telephone mode, and is manually switched to a FAX mode if necessary, the same number must be registered twice as telephone and FAX numbers upon registration of destination dial number data. In other words, when such a number is registered as a telephone number in the electronic data memorandum, automatic call generation processing cannot be performed from a facsimile apparatus, and vice versa. In order to eliminate such an inconvenience, the data string shown in FIG. 38 is provided with a common identification code "AA" with which automatic call generation processing can be performed to both the facsimile apparatus and the telephone set. When dial number data is registered together with the identification code "AA" and the host apparatus identifies this code, automatic call generation processing can be executed from either the facsimile apparatus or the telephone set.

Ninth Embodiment

In the eighth embodiment wherein telephone and FAX numbers are registered as unit data in an electronic data memorandum, and the telephone or FAX number is selected depending on a type of host apparatus, i.e., a telephone set or a facsimile apparatus, when one facsimile apparatus is normally used in a telephone mode, the electronic data memorandum cannot be set on the facsimile apparatus to perform automatic call generation processing to a destination telephone set.

In consideration of this respect, according to this embodiment, even when telephone and FAX number data are registered together as unit data in an electronic data memorandum carried by a user, both a telephone call and a FAX communication can be performed using a facsimile apparatus.

When an original is set on a read unit, or when a transmission original is stored in a memory, a CPU 43 of a facsimile apparatus selects FAX number data of dial number data sent from the electronic data memorandum. When no original set on the read unit or when no transmission original is stored in the memory, the CPU 43 selects telephone number data. The CPU 43 executes call generation processing based on these data.

The arrangement of the facsimile apparatus of this embodiment is common to that shown in FIG. 11. When a microcomputer system 39 detects based on a state of a switch 38 that the electronic data memorandum 30 is set, it causes a photoreception sensor 37 to photoelectrically convert a light signal sent from the electronic data memorandum 30. The microcomputer system 39 controls a modem 40 on the basis of FAX number data following telephone number data and a pause code, thus executing a call generation operation.

In this case, it is checked if an original is set on a read unit 46 or a transmission original is stored in a RAM 41. More specifically, an original set on the read unit can be detected by a CCD image sensor 41-1. When the CPU 43 detects that an original is set, it causes the CCD image sensor 41-1 to read an original, and convert it into an analog electrical signal. The analog signal is A/D-converted by an A/D converter 41-2, and is temporarily stored in the memory (RAM) 41 of the microcomputer system 39 as image data. In this case, FAX number data of the telephone and FAX number data from the electronic data memorandum is selected, and call generation processing is executed.

In contrast to this, when no transmission original is stored and a call is to be generated using dial number data from the electronic data memorandum, the CPU 43 selects the telephone number data, and executes call generation processing.

The arrangement and the processing sequence of the electronic data memorandum are common to those in the eighth embodiment.

FIG. 39 is a flow chart for explaining a character transmission processing sequence of the electronic data memorandum of a system which can transmit character data in addition to dial number data, and can send a message to a destination facsimile apparatus in addition to an original input from a read unit of a facsimile apparatus as a modification of this embodiment. After the instruction decoder 6 transmits dial number data in step S67 in FIG. 39 (after YES is determined in step S68), it checks in step S69 if character data to be transmitted is registered in the RAM 4. If NO in step S69, the flow returns to step S61 as in FIG. 6. However, if YES in step S69, message data input and stored in steps S64 and S65 is transmitted. The same operation is repeated until YES is determined in step S91, and message data is transmitted.

The operation of the facsimile apparatus will be described below with reference to the block diagram of FIG. 11. The CPU 43 stores a telephone number, a pause code, a FAX number, a pause code, and the following message (for example, address data, sender's name data, and a message text) in the memory (RAM) 41 via an I/0 for performing other control and a bus line. The address, sender's name, and message text data are demodulated on the memory (RAM) 41 (an area different from that where the above-mentioned data are stored) on the basis of character patterns stored in a memory (ROM) 42 as bit images. In this manner, when character data are transmitted together with dial number data, the facsimile apparatus as the host apparatus executes call generation processing using the FAX number data, and then transmits the stored image data to a destination apparatus (called party) after a line is connected.

Figure 40:
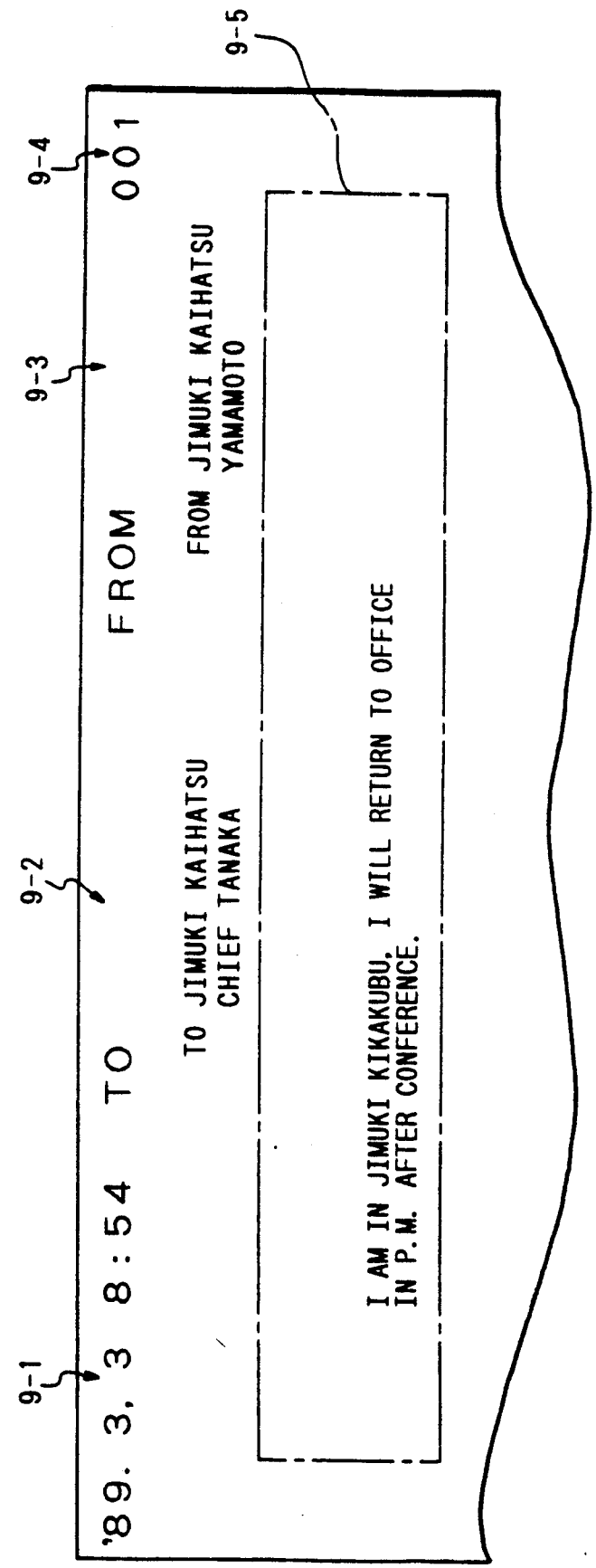
FIG. 40 shows a print-out of the ninth embodiment.

FIG. 40 shows a print-out of data received at the called party. The print-out shown in FIG. 40 contains transmission date data 9-1, page count data 9-4 of a message added by a host facsimile apparatus, destination name data 9-2, sender's name data 9-3, and a message text 9-5, which is transmitted from the electronic data memorandum to the host facsimile apparatus, and is printed out at the destination facsimile apparatus. In this manner, in this system, even if no original is set on the read unit, message data stored in the electronic data memorandum can be transmitted to the destination facsimile apparatus. A destination to be called is designated by the electronic data memorandum, and the electronic data memorandum is set on the facsimile apparatus or the telephone set, thus providing a very effective system which is free from cumbersome operations for reading out a telephone or FAX number depending on the type of host apparatus, i.e., the telephone set or facsimile apparatus.

Tenth Embodiment

In this embodiment, when a transmission original is set on a read unit or when a read original is stored in a memory, a facsimile apparatus sends a message indicating this to an electronic data memorandum using a light signal. Upon detection of the light signal, the electronic data memorandum transmits a FAX number. On the other hand, when no light signal is detected, the electronic data memorandum transmits a telephone number.

Figure 41:
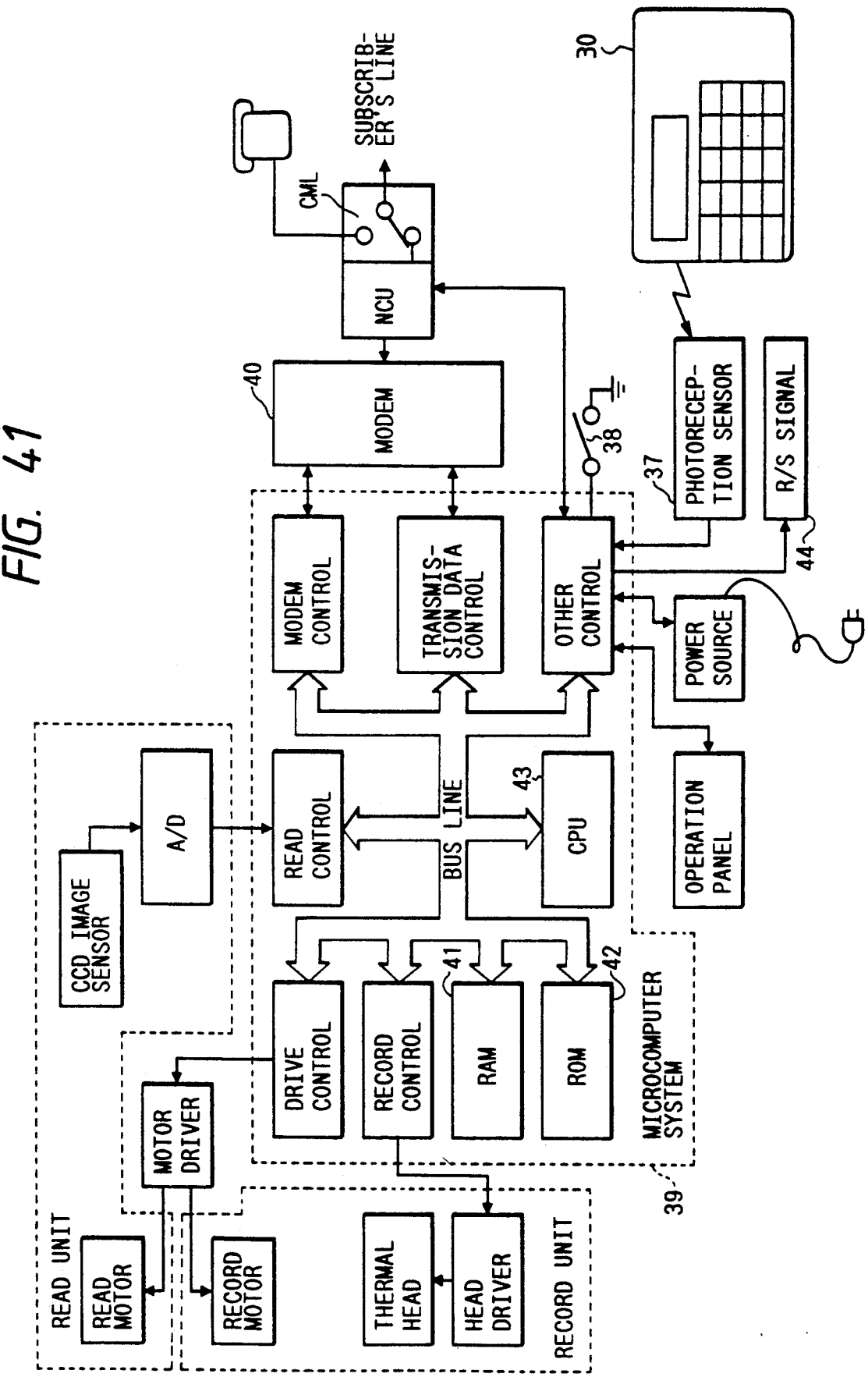
FIG. 41 is a block diagram of a facsimile apparatus according to the tenth embodiment of the present invention.

FIG. 41 shows an arrangement of the facsimile apparatus of this embodiment. In the arrangement of FIG. 41, an R/S signal transmission circuit 44 having a light-emitting diode is provided to the arrangement shown in FIG. 11.

When a CPU 43 detects based on an ON state of a switch 38 that an electronic data memorandum 30 is set, it checks using a CCD image sensor if an original is set on a read unit or if transmission original information is stored in a RAM 41. If there is an original to be transmitted, the light-emitting diode of the R/S signal transmission circuit 40 is turned on. Then, call generation processing is executed according to a light signal received by a photoreception sensor 37.

Figure 42:
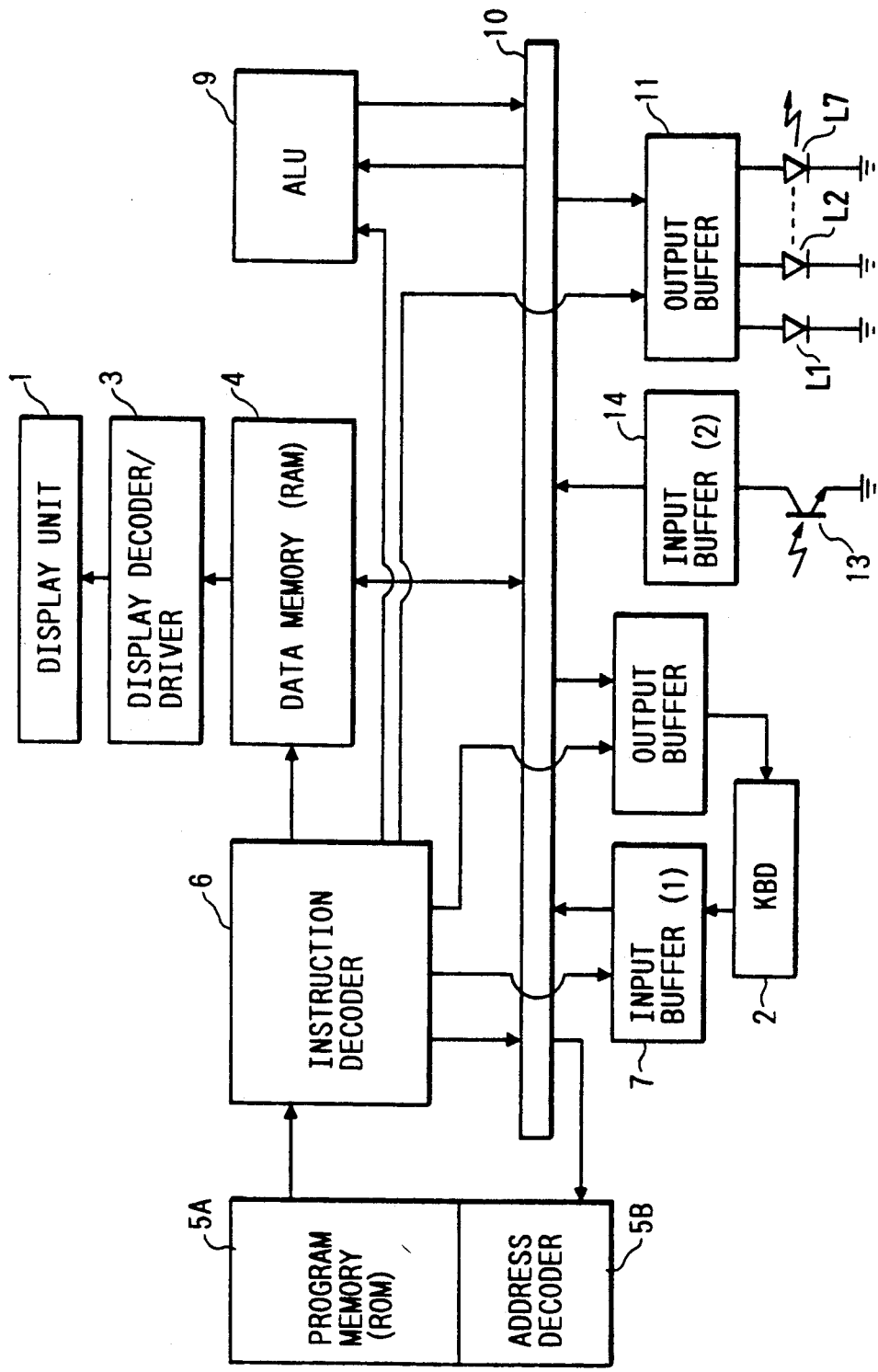
FIG. 42 is a block diagram of an electronic data memorandum of the tenth embodiment.

FIG. 42 shows an arrangement of the electronic data memorandum of this embodiment. In the arrangement shown in FIG. 42, a photoreception element 13 and an input buffer (2) 14 are added to the arrangement shown in FIG. 5. The processing sequence of the electronic data memorandum of this embodiment is common to that shown in FIG. 27.

When the photoreception element 13 receives a light signal from the facsimile apparatus in step S63, an instruction decoder 6 sets a facsimile transmission mode in step S64. If depression of a dial start key 2-1 (FIG. 4) is detected in step S63, the flow advances to step S77. If the facsimile transmission mode is set, the instruction decoder 6 reads out a FAX number corresponding to a displayed name from the RAM 4, and then drives an LED. On the other hand, if the facsimile transmission mode is not set, i.e., if an R/S signal is not received in advance, the instruction decoder 6 reads out a telephone number corresponding to a displayed name, and drives the LED.

Therefore, a facsimile apparatus 35 can switch according to the presence/absence of an original to be transmitted whether a facsimile apparatus or a telephone set is to be called.

When the electronic data memorandum is set on a telephone set to execute call generation processing, a light-emitting element is omitted from the telephone set, as shown in FIG. 1, so that a telephone number can be output from the electronic data memorandum.

As described above, according to the embodiment of the present invention, call generation processing is executed on the basis of a light signal, so that an erroneous operation due to an environmental influence can be prevented. Therefore, call generation processing can be reliably executed.

According to the embodiment of the present invention, when it is detected that an electronic data memorandum is connected to a communication apparatus, transmission of control information is enabled, and an operation need not switch a mode.

According to the embodiment of the present invention, since a communication method of a communication apparatus is recognized to transmit control information, an operator need not perform an operation according to a type of communication apparatus. Therefore, wrong control information will not be transmitted due to a judgment error of the operator.

According to the embodiment of the present invention, since a necessary dial number is selected from a plurality of sets of dial numbers received from a dial number generation device, an operator need not select a dial number. Therefore, a wrong call will not be made by a selection error of the operator.

The preferred embodiments of the present invention have been described. However, the present invention is not limited to the arrangements of the above embodiments, and various other changes and modifications may be made within the spirit and scope of the invention.

What is claimed is:

1. A call generation apparatus comprising:
   a plurality of keys;
   a plurality of photoreception elements; and
   call generation means for generating a call according to outputs of said plurality of keys and outputs of said plurality of photoreception elements,
   wherein said plurality of keys comprises a plurality of informing lines for informing operating states of said plurality of keys to said call generation means, said plurality of informing lines are connected to said plurality of photoreception elements, and
   said call generation means detects the outputs of said plurality of keys and the outputs of said plurality of photoreception elements through said plurality of informing lines.

2. An apparatus according to claim 1, wherein said call generation means comprises a switch which is turned on if a device for controlling the switch is mounted in the call generation means, and said call generation means does not generate a call in a state in which the switch is turned off.

3. A call generation apparatus comprising:
   communication means for performing a communication according to one of a plurality of communication modes;
   mounting means for mounting a portable device;
   reception means for receiving a plurality of sets of call generation data transmitted by the portable device;
   setting means for setting the communication mode of said communication means, from among said plurality of communication modes;
   selection means for selecting one of the plurality of sets of call generation data according to the communication mode of said communication means set by said setting means; and
   call generation means for generating a call according to the selected set of call generation data.

4. An apparatus according to claim 3, wherein said communication means performs the communication in a transmission mode if transmission data is present, and said selection means selects the call generation data according to a presence/absence of the transmission data.

5. An apparatus according to claim 3, wherein said selection means selects, from among the plurality of the call generating data, the call generation data continuously received with respect to a predetermined code from the portable device.

6. An apparatus according to claim 3, wherein said selection means selects, from among the plurality of sets of the call generation data and the call generation data of the selected set is received in a predetermined order.

7. An apparatus according to claim 3, wherein said selection means selects one of the plurality of sets of the call generation data in accordance with a format of the plurality of the sets of call generation data.

8. An apparatus according to claim 3, wherein said reception means receives a light from said portable device.

9. An apparatus according to claim 1, wherein said plurality of keys includes a ten-key keypad, the number of said plurality of photoreception elements is seven, and the number of said plurality of informing lines is seven.

10. An apparatus according to claim 1, wherein each of said plurality of photoreception elements comprises an analog switch for connecting said plurality of informing lines, and each of said plurality of photoreception elements controls said analog switch on the basis of light reception.

11. An apparatus according to claim 1, wherein said plurality of keys includes a ten-key keypad, the number of said plurality of photoreception elements is four, the number of said plurality of informing lines is seven, and four of said plurality of informing lines are connected to said plurality of photoreception elements.

12. A call generation apparatus comprising:
    reception means for receiving call generation data from a portable device;
    recognition means for recognizing a type of said portable device; and
    call generation means for generating a call according to the call generation data and the type of said portable device.
    wherein said recognition means recognizes whether said portable device is the type to parallely transmitting the call generation data from plural terminals or the type to serially transmitting the call generation data from a single terminal.

13. An apparatus according to claim 12, wherein said reception means receives a light from said portable device.

14. A call generation system comprising:
    a portable device for storing a plurality of sets of call generation data, selecting one of the plurality of sets of call generation data according to a predetermined signal from a call generation apparatus and transmitting the selected call generation data as an optical signal; and
    said call generation apparatus comprising:
      sending means for sending the predetermined signal to said portable device,
      receiving means for receiving selected call generation data transmitted as the optical signal by said portable device, and
      call generation means for generating a call according to the selected call generation data received by said receiving means.

15. A system according to claim 14, wherein said call generation means comprises transmitting means for transmitting data to a call line, and said sending means sends the predetermined signal according to the presence/absence of transmission data.

16. A system according to claim 15, wherein said transmitting means transmits facsimile data.

17. A system according to claim 16, wherein said portable device transmits a facsimile/telephone number in accordance with the presence/absence of transmission data.

18. A system according to claim 14, wherein said sending means sends the predetermined signal as an optical signal.

19. A system according to claim 14, wherein said portable device further comprises mounting means for mounting thereon said portable device and detecting means for detecting that said portable device is mounted on said mounting means, and said sending means sends the predetermined signal if it is detected by said detecting means that said portable device is mounted.

20. A system according to claim 14, wherein said sending means sends the predetermined signal when said portable device is in good contact with said call generation apparatus.

21. An apparatus according to claim 3, wherein said communication means performs a communication according to one of a data communication mode and a speech communication mode, said setting means sets the data communication mode when transmission data is present, and said selection means selects call generation data for data communication.

22. A call generating apparatus comprising:

a plurality of keys;

a plurality of detection elements for detecting states of a plurality of output terminals of a portable device;

call generation means for generating a call according to outputs of said plurality of keys and outputs of said plurality of detection elements, wherein said plurality of keys comprises a plurality of informing lines for informing operating states of said plurality of keys to said call generation means, said plurality of informing lines are connected to said plurality of detection elements, and said call generation means detects the outputs of said plurality of keys and the outputs of said plurality of detection elements through said plurality of informing lines.

23. An apparatus according to claim 22, wherein said plurality of keys include a ten-key key pad, the number of said plurality of detection elements is seven, and the number of said plurality of informing lines is seven.

24. An apparatus according to claim 22, wherein each of said plurality of detection elements comprises an analog switch for connecting said plurality of informing lines, and each of said plurality of detection elements controls said analog switch on the basis of the states of said plurality of output terminals of said portable device.

25. An apparatus according to claim 22, wherein said plurality of keys includes a ten-key key pad, the number of said plurality of detection elements is four, the number of said plurality of informing lines is seven, and four of said plurality of informing lines are connected to said plurality of detection elements.

26. An apparatus according to claim 22, wherein each of said plurality of detection elements comprises a photoreception element.

* * * * *

UNITED STATES PATENT AND TRADEMARK OFFICE
CERTIFICATE OF CORRECTION

PATENT NO. : 5,283,820
DATED : February 1, 1994
INVENTOR(S) : MASUMI ISHIWATARI ET AL.

It is certified that error appears in the above-indentified patent and that said Letters Patent is hereby corrected as shown below:

COLUMN 4

Line 32, "is" (second occurrence) should read --are--.

COLUMN 7

Line 27, "memory," should read --memory--.

COLUMN 13

Line 38, "is" shuld read --are--.

COLUMN 18

Line 25, "Oh" should read --On--.

Signed and Sealed this

Thirteenth Day of September, 1994

Attest:

BRUCE LEHMAN

*Attesting Officer*  *Commissioner of Patents and Trademarks*